United States Patent
Faga et al.

(10) Patent No.: US 11,216,824 B1
(45) Date of Patent: Jan. 4, 2022

(54) ROLE ASSIGNMENT FOR ENHANCED ROADSIDE ASSISTANCE

(71) Applicant: Allstate Insurance Company, Northbrook, IL (US)

(72) Inventors: Mark E. Faga, Evanston, IL (US); Ryan M. Briggs, Glen Ellyn, IL (US); Margaret K. Striebich, Jacksonville Beach, FL (US)

(73) Assignee: Allstate Insurance Company, Northbrook, IL (US)

( * ) Notice: Subject to any disclaimer, the term of this patent is extended or adjusted under 35 U.S.C. 154(b) by 882 days.

(21) Appl. No.: 14/632,109

(22) Filed: Feb. 26, 2015

(51) Int. Cl.
*G06Q 10/06* (2012.01)
*G06Q 30/02* (2012.01)
*G06Q 30/00* (2012.01)
*G06Q 10/00* (2012.01)

(52) U.S. Cl.
CPC ..... *G06Q 30/016* (2013.01); *G06Q 10/06311* (2013.01); *G06Q 10/20* (2013.01); *G06Q 30/0236* (2013.01)

(58) Field of Classification Search
None
See application file for complete search history.

(56) References Cited

U.S. PATENT DOCUMENTS

| | | | |
|---|---|---|---|
| 6,028,537 A | 2/2000 | Suman et al. | |
| 6,304,174 B1 | 10/2001 | Smith et al. | |
| 6,526,335 B1 | 2/2003 | Treyz et al. | |
| 6,694,234 B2 | 2/2004 | Lockwood et al. | |
| 6,768,934 B2 | 7/2004 | Sumida et al. | |
| 7,242,948 B2 | 7/2007 | Fleischer et al. | |
| 7,404,009 B1 | 7/2008 | Halasz et al. | |
| 8,145,275 B2 | 3/2012 | Cunningham et al. | |
| 8,229,462 B2 | 7/2012 | Bennett, Jr. | |
| 8,583,320 B2 | 11/2013 | Harris et al. | |
| 8,595,034 B2 | 11/2013 | Bauer et al. | |

(Continued)

OTHER PUBLICATIONS

Auto Preparedness Toolbox, Our Daily Free App Guide, http://appadvice.com/applists/show/auto-preparedness-toolbox, pp. 1-8, dated May 8, 2014.

(Continued)

*Primary Examiner* — Rutao Wu
*Assistant Examiner* — Sarjit S Bains
(74) *Attorney, Agent, or Firm* — Polsinelli PC

(57) ABSTRACT

An enhanced roadside assistance system may modify service provider role assignments in roadside assistance accounts. The system may be configured to modify a service provider role assignment associated with a roadside assistance account by assigning a service provider role to each of a plurality of service providers. The system may receive a service request from a roadside assistance device for an individual associated with a vehicle. The system may identify one or more of the service providers offering a type of service indicated by the service request. Based on the service provider role assignment, the system may transmit a notification of the service request to at least one of a plurality of computing devices associated with one of the service providers. The system may receive a response comprising one or more discounts and transmit the response to the roadside assistance device for presentation to the individual.

18 Claims, 14 Drawing Sheets

(56) References Cited

U.S. PATENT DOCUMENTS

| | | | |
|---|---|---|---|
| 8,639,410 | B1 | 1/2014 | Billman |
| 8,645,014 | B1* | 2/2014 | Kozlowski ............ H04W 84/12 |
| | | | 455/404.1 |
| 8,660,709 | B2 | 2/2014 | Harvey et al. |
| 8,731,974 | B2 | 5/2014 | Pandhi et al. |
| 8,750,902 | B2 | 6/2014 | Xiao et al. |
| 9,053,588 | B1 | 6/2015 | Briggs et al. |
| 2002/0073012 | A1 | 6/2002 | Lowell et al. |
| 2002/0091540 | A1 | 7/2002 | Stumne et al. |
| 2004/0225582 | A1 | 11/2004 | Spitzer |
| 2008/0015923 | A1 | 1/2008 | Masaba |
| 2008/0086564 | A1 | 4/2008 | Putman et al. |
| 2008/0255888 | A1* | 10/2008 | Berkobin ............... G06Q 40/08 |
| | | | 705/4 |
| 2009/0079555 | A1* | 3/2009 | Aguirre De Carcer ...................... |
| | | | G07C 5/008 |
| | | | 340/441 |
| 2009/0093236 | A1* | 4/2009 | Balan ...................... H04W 4/02 |
| | | | 455/411 |
| 2009/0125178 | A1* | 5/2009 | Wilson ................... G06Q 10/20 |
| | | | 701/31.4 |
| 2009/0171684 | A1* | 7/2009 | Samolinski ............ G06Q 10/10 |
| | | | 705/305 |
| 2009/0186596 | A1 | 7/2009 | Kaltsukis |
| 2009/0233572 | A1 | 9/2009 | Basir |
| 2009/0281850 | A1 | 11/2009 | Bruce et al. |
| 2009/0313077 | A1* | 12/2009 | Wheeler, IV .......... G01C 21/26 |
| | | | 705/7.14 |
| 2010/0332133 | A1* | 12/2010 | Harris .................... G01C 21/26 |
| | | | 701/431 |
| 2011/0063138 | A1 | 3/2011 | Berkobin et al. |
| 2011/0111728 | A1 | 5/2011 | Ferguson et al. |
| 2011/0288700 | A1 | 11/2011 | Pebbles |
| 2012/0005285 | A1 | 1/2012 | Lin |
| 2012/0136527 | A1* | 5/2012 | McQuade ............... G06Q 30/08 |
| | | | 701/29.4 |
| 2012/0136743 | A1 | 5/2012 | McQuade et al. |
| 2012/0282908 | A1 | 11/2012 | Nicolini |
| 2013/0103749 | A1* | 4/2013 | Werth ................... G06F 9/4446 |
| | | | 709/203 |
| 2013/0124032 | A1 | 5/2013 | Singh et al. |
| 2013/0196294 | A1 | 8/2013 | Lakshmanaperumal |
| 2013/0225111 | A1* | 8/2013 | Hatton .................... G07C 5/008 |
| | | | 455/404.1 |
| 2013/0232002 | A1 | 9/2013 | Zhao et al. |
| 2013/0304278 | A1 | 11/2013 | Chen |
| 2013/0338873 | A1 | 12/2013 | Baalu |
| 2014/0019522 | A1 | 1/2014 | Weng et al. |
| 2014/0066132 | A1 | 3/2014 | Burke et al. |
| 2014/0067152 | A1 | 3/2014 | Swanson et al. |
| 2014/0142805 | A1* | 5/2014 | Frye ...................... B60R 16/023 |
| | | | 701/36 |
| 2014/0195625 | A1 | 7/2014 | Weldon |
| 2014/0199962 | A1 | 7/2014 | Mohammed et al. |
| 2014/0206308 | A1 | 7/2014 | Hatton |
| 2014/0279707 | A1* | 9/2014 | Joshua ............... G06Q 30/0283 |
| | | | 705/400 |
| 2014/0309853 | A1* | 10/2014 | Ricci ................... B60R 25/1004 |
| | | | 701/34.4 |
| 2014/0357226 | A1 | 12/2014 | Charugundla |
| 2015/0024702 | A1 | 1/2015 | Morgan et al. |
| 2015/0137972 | A1 | 5/2015 | Nepo |
| 2016/0092962 | A1 | 3/2016 | Wasserman et al. |

OTHER PUBLICATIONS

AutoMD, Android Apps on Goggle Play, https://play.goddle.com/store/apps/details?id=com\usas.automd.activity, pp. 1-6, dated May 8, 2014.

GEICO Emergency Road Service, Breakdowns Can Happen Anytime, http://www.geico.com/getaquote/auto/emergency-road-service, pp. 1-4, dated May 8, 2014.

State Farm, Emergence Road Services, https://www.statefarm.com/claims/resources/auto/emergency-road-service, p. 1, dated May 6, 2014.

The Hartford, Mobile App, The Hartford Smartphone App for Auto and Home, http://www.thehartford.com/service/mobile-tools, pp. 2, dated May 8, 2014.

Mercedes-Benz, mbrace In-Vehicle Telematics Technology, Safety and Personal Assistance, http://www.mbusa.com/mercedes/mbrace?src=4376#!layout=/mbrace/travel_assistance$waypoint+mbrace-travel_assistance, pp. 1-22, dated Jun. 25, 2014.

Onstar, Introducing OnStarwith 4GLTE, https://www.onstar.com/web/portal/home?g+1, pp. 1-4, dated Jun. 25, 14.

The BMW Roadside Assistance Program, pp. 1-2, date unknown.

Toyota Safety Connect, Roadside Assistance, Collision Notification & More!, We're Here to Help, http://www.toyota.com/safety-connect/#Roadside, pp. 1-4, dated Jun. 26, 2014.

Verizon Navigator goes v5.0, adds social networking, roadside assistance, http://www.wpcentral.com/verizon-navigator-goes-v50-adds-social-networking-roadside-assistance, pp. 1-5, dated Jun. 26, 2014.

Allstate Emergency Roadside Assistance, Allstate Roadside Services,http://www.allstate.com/auto-roadside-services/good-hands-roadside.aspx, pp. 1-2, dated Jun. 26, 2014.

Biener Audi, Audi 24-Hour Roadside Assistance, http://www.bieneraudi.com/roadside-assistance.htm, pp. 1-2, dated May 26, 2014.

CarShield by www.mycarshield.com; Feb. 2, 2011, 1 page.

Thomas, David, "Hundai BlueLink: An OnStar Rival and More," Jan. 5, 2011, 5 pages.

Apr. 21, 2017—U.S. Non-Final Office Action—U.S. Appl. No. 14/632,130.

Oct. 5, 2017—U.S. Final Office Action—U.S. Appl. No. 14/632,130.

May 3, 2018—U.S. Non-Final Office Action—U.S. Appl. No. 14/632,130.

Sep. 21, 2018—U.S. Final Office Action—U.S. Appl. No. 14/632,130.

Apr. 1, 2019—U.S. Non-Final Office Action—U.S. Appl. No. 14/632,130.

Nov. 1, 2019—U.S. Final Office Action—U.S. Appl. No. 14/632,130.

* cited by examiner

ROLE ASSIGNMENT FOR ENHANCED ROADSIDE ASSISTANCE

BACKGROUND

A driver may experience a variety of unexpected roadside incidents that may leave him or her stranded in a vehicle on a side of a road. For instance, a driver may be involved in a car accident and may need a tow truck for his or her damaged vehicle. In another instance, a driver may need a jump start or gas delivery for his or her stalled vehicle. For roadside incidents such as these, insurance companies may offer roadside assistance services for drivers.

Conventional roadside assistance services may include notifying an insurance agent or a service provider of a driver involved in a roadside incident. The insurance agent or the service provider may receive details of the roadside incident, verify that the driver is insured, and determine if the driver's vehicle is registered with a roadside assistance account. In some cases, the driver's vehicle may be registered with a roadside assistance account, but the driver might not be the account holder of the roadside assistance account. For example, the driver may be a teenager who drives a parent's vehicle, in which the parent is the account holder of the roadside assistance account. The teenager may be associated with the roadside assistance account, but he or she might not be able to make decisions regarding repair of the vehicle.

Conventional roadside assistance services do not account for such situations in which a driver in a stranded vehicle on a side of a road is not an account holder of the roadside assistance account. Accordingly, there may be a need for improved approaches to roadside assistance that support multiple individuals that are associated with a vehicle.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing computerized methods, systems, devices, and apparatuses for providing a roadside assistance system to assign service provider roles and allow communication of status updates and service requests between individuals and service providers. The disclosure describes a system comprising a roadside assistance device associated with an individual associated with a vehicle that is registered in a roadside assistance account, a plurality of computing devices individually associated with one of a plurality of service providers that offer at least one type of service, and a roadside assistance system. The roadside assistance system may be configured to modify a service provider role assignment associated with the roadside assistance account by assigning a service provider role to each of the plurality of service providers, receive, from the roadside assistance device, a service request for the individual after a roadside incident with the vehicle, identify one or more of the service providers offering a type of service indicated by the service request, based on the service provider role assignment, transmit a notification of the service request to at least one of the plurality of computing devices associated with one of the service providers, receive, from at least one of the plurality of computing devices, a response associated with one of the service providers, wherein the response comprises one or more discounts for the type of service offered by the service provider, and transmit the response to the roadside assistance device for presentation to the individual.

The disclosure also describes an apparatus comprising at least one processor, a network interface configured to communicate, via a network, with a roadside assistance device, and memory storing computer-readable instructions that, when executed by the at least one processor, cause the apparatus to modify a service provider role assignment associated with a roadside assistance account by assigning a service provider role to each of one or more service providers that offer at least one type of service, receive, from the roadside assistance device, a service request for an individual associated with a vehicle after a roadside incident, wherein the vehicle is registered in the roadside assistance account, transmit a request notification of the service request to at least one of the service providers based on the service provider role assignment, receive a response from at least one of the service providers, wherein the response comprises one or more discounts for the type of service offered by the service provider, and transmit, to the roadside assistance device, the response for presentation to the individual.

In addition, aspects of this disclosure provide a method that includes modifying, by a computing device, a service provider role assignment associated with a roadside assistance account by assigning a service provider role to each of one or more service providers offering at least one type of service, receiving, by the computing device from a roadside assistance device, a service request for an individual associated with a vehicle after a roadside incident, wherein the vehicle is registered in the roadside assistance account, transmitting, by the computing device, a request notification of the service request to at least one of the one or more service providers based on the service provider role assignment, receiving, by the computing device, a response from at least one of the service providers, wherein the response comprises one or more discounts for the type of service offered by the service provider, and transmitting, by the computing device, the response to the roadside assistance device for presentation to the individual.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

Figure 1:
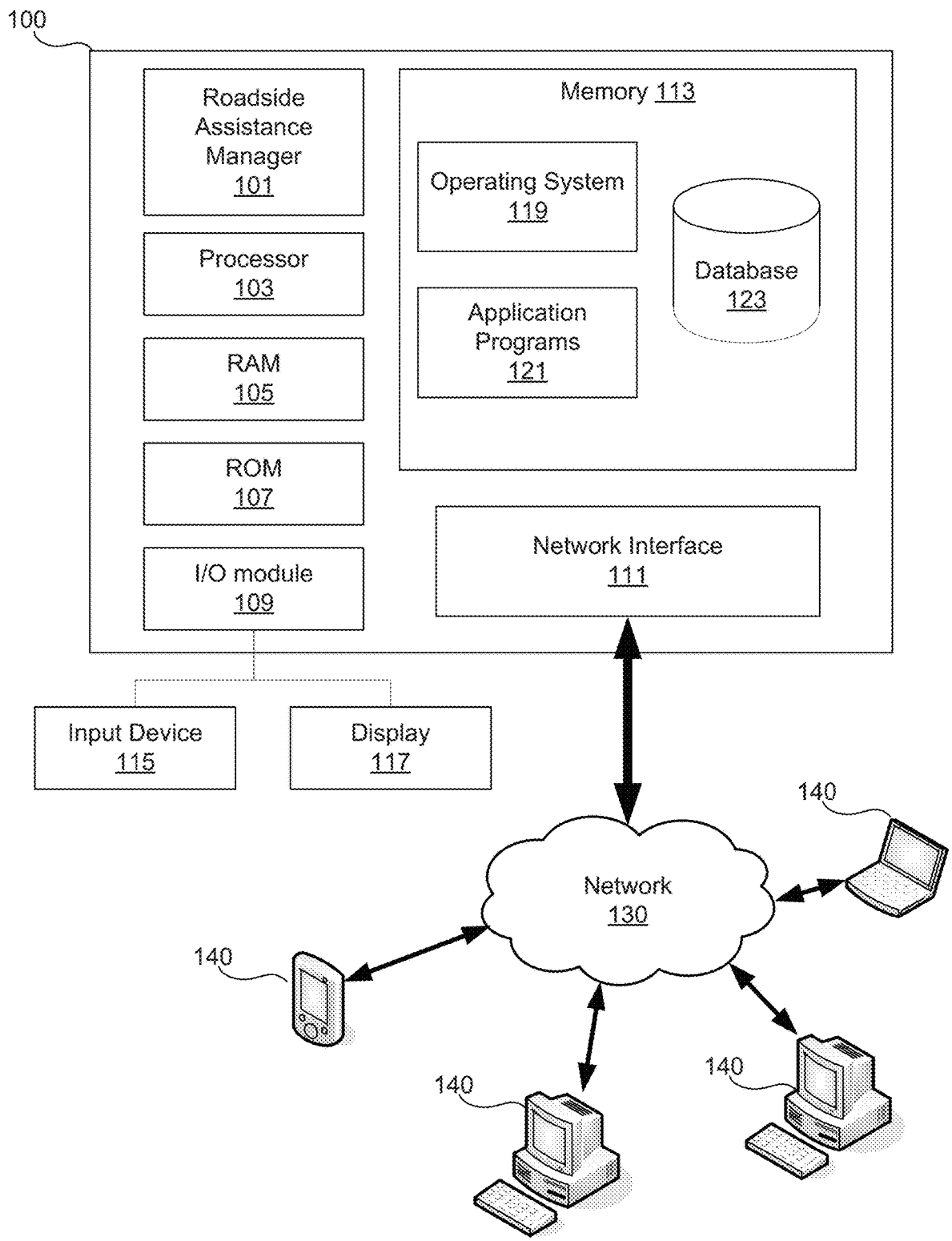
FIG. 1 depicts a block diagram of an example roadside assistance device that may be used in accordance with one or more example embodiments.

In accordance with various aspects of the disclosure, computerized methods, systems, devices, and apparatuses are disclosed that provide a roadside assistance system for receiving driver information, assigning roles to individuals, notifying individuals of a roadside incident, sending status updates, allowing communication between individuals, and allowing communication between computing devices operated by individuals and systems maintained by service providers. The roadside assistance system may be integrated across a plurality of platforms and may be employed by an insurance company that offers roadside assistance for individuals associated with a vehicle that is registered in a roadside assistance account. Individuals may include at least one or more of parents, guardians, children (e.g., teenagers), relatives, and/or family friends associated with the vehicle. For example, an individual may be associated with the vehicle if the individual is an owner of the vehicle and/or has access and/or permission to drive the vehicle. For example, a parent may be the owner of a vehicle, and a teenager may have access and/or permission from the parent to drive the vehicle. Thus, both the parent and the teenager may be individuals associated with the vehicle. Additionally or alternatively, an individual may be associated with the vehicle if the individual is identified (e.g., as a driver) on an insurance policy that insures the vehicle. For example, a parent may be the policy holder of an insurance policy and registered in a roadside assistance account, and a teenager may be listed as a driver of the vehicle on the insurance policy. Thus, the teenager may be covered by insurance and considered as an individual associated with the vehicle for coverage in a roadside assistance service or program. In some circumstances, an individual that is not an owner of the vehicle or related to the owner of the vehicle (e.g., a family friend) may be considered to be associated with the vehicle if that individual has been given permission to drive the vehicle by, e.g., the vehicle owner.

The roadside assistance system may receive driver information for individuals associated with a vehicle that is registered in a roadside assistance account from computing devices operated by those individuals. The driver information may include at least one of a name, an age, a driver's license number, a driving record, a vehicle make, a vehicle model, an insurance policy number, and the like for each individual. Based on the driver information, the roadside assistance system may assign a role to each individual associated with the vehicle by modifying a role assignment associated with the roadside assistance account. The role assignment may be stored by the roadside assistance system, associated with the roadside assistance account, and may allow individuals to communicate (e.g., via text, phone call, mobile application, and the like) with each other, with service providers, and with insurance agents and obtain information associated with the vehicle that is registered in a roadside assistance account. In an embodiment, there may be different types of roles that provide individuals with various privileges with respect to the roadside assistance account. For example, the roadside assistance system may assign an administrative role to one or more individuals, such as parent(s) and/or guardian(s). The administrative role may allow an individual to access and/or modify one or more settings for a roadside assistance account. Settings may include one or more of billing information, account information, and preferences for the roadside assistance account. For example, the administrative role may permit an individual to designate one or more service providers (e.g., as preferences) to repair the vehicle after a roadside incident.

The roadside assistance system may also assign a non-administrative role to one or more individuals, such as teenagers. The non-administrative role may allow an individual to utilize the roadside assistance service and communicate with other individuals, insurance agents, and service providers to obtain service for a vehicle. However, the non-administrative roles might not allow the individual to modify one or more settings for the roadside assistance account that are set by an administrator (e.g., a parent with an administrative role). For example, a parent or guardian may be an owner of the vehicle and an account holder for a corresponding insurance policy and/or a roadside assistance account. The parent may be more informed about the vehicle and able to make better decisions regarding the vehicle than decisions that a teenager may make about the vehicle after a roadside incident. For example, the teenager may be driving the vehicle and may encounter a roadside incident unexpectedly (e.g., a car accident, a tire blowout, and the like), wherein the teenager might not know what to do. The teenager may use the roadside assistance system to contact and/or communicate with a parent and share details regarding the roadside incident. For example, the parent may be able to provide information to the teenager (e.g., vehicle information, insurance information, account information, billing information, and the like) and instructions on how to proceed after the roadside incident. The parent may also designate a particular service provider to repair the vehicle after roadside incidents. Thus, the teenager may be able to use the roadside assistance system to access the information provided by the parent and contact the designated service provider to repair the vehicle after the roadside incident. For instance, the teenager may use billing information provided by the parent to pay for a service obtained from the designated service provider (e.g., as instructed by the parent).

Furthermore, the roadside assistance may facilitate communication between parents, teenagers, insurance agents, and service providers. In addition to assigning roles to multiple individuals associated with a vehicle, the roadside assistance system may assign roles to service providers for roadside assistance. In an embodiment, there may be different service providers that are partnered with an insurance company that offers roadside assistance. The roadside assistance system may allow service providers to provide various services, benefits, and/or discounts to customers. In some embodiments, one or more services from service providers may be made available to individuals by request at any time. For example, an individual with a registered vehicle may request a specific service at any time. In another example, an individual with a registered vehicle may request a specific service in response to a roadside incident. Additionally, the individual may request a single service or multiple services at a time. The roadside assistance system may receive a service request from an individual and identify one or more service providers associated with a type of service indicated by the service request. For example, different service providers may provide different types of services, such as repair services, transportation services, lodging services, medical services, and food services. In an embodiment, an individual may indicate the type of service desired in the service request. The roadside assistance system may assign a service provider role to each of the one or more service providers offering the indicated type of service. The service provider role may allow one or more service providers (e.g., service providers offering the requested type of service) to receive notifications, accept service requests, and/or bid on service requests submitted by individuals.

The roadside assistance system may send a request notification of the service request to systems respectively operated by each of the one or more service providers based on an assignment of service provider roles. In an embodiment, only service providers (e.g., only service providers who have been assigned a service provider role) who offer the requested type of service may be notified of the service request. One or more of the service providers who are notified may then respond to the service request. That is, the roadside assistance system may receive at least one response from the one or more service providers and send the at least one response to the individual with the registered vehicle. In an embodiment, the at least one response may comprise one or more discounts for the type of service offered by the one or more service providers. For example, a service provider may respond to the service request by sending specific discounts or coupons for the type of service requested. A service provider's response may also include one or more additional discounts for other types of service offered by the service provider. In another embodiment, the at least one response may comprise a bid with a proposed price for the type of service requested and details of the type of service offered by the one or more service providers. For example, a service provider may respond with a bid and details about the service to be provided. In another embodiment, the service provider may send a response to the roadside assistance system for accepting the service request.

Upon receiving the at least one response, the individual may make a selection of the one or more service providers. For example, the individual may make his or her selection based on one of a bid, proposed price, details of the type of service, discounts, coupons, and/or deals offered by a certain service provider. In another example, the individual may select a service provider based on which response is received first out of the one or more service providers. After the individual selects a service provider, the roadside assistance system may receive a notification or confirmation that the service provider has been selected. The roadside assistance system may then notify the selected service provider and/or the one or more service providers that the service request has been accepted by the selected service provider. The roadside assistance system may also notify the one or more service providers that a particular service provider has been selected by the individual. Thus, if the roadside assistance system receives another response from a second service provider, then the roadside assistance system may notify the second service provider that the service request has already been accepted by the selected service provider. Furthermore, insurance agents or employees associated with the insurance company may access the roadside assistance system to monitor status updates and communicate with individuals and service providers after a roadside incident. The roadside assistance system may also keep track of maintenance records for each insured vehicle of an account-holding individual, along with a backend billing system for managing account information.

In particular, the present disclosure teaches an enhanced roadside assistance system that may be beneficial for assigning roles to individuals associated with a vehicle (e.g., teenagers, parents, guardians, and the like) and to services providers associated with different types of service. The assigned roles may allow improve conventional roadside assistance by assigning different roles to individuals associated with a vehicle for communicating with each other, receiving and sending status updates, making and receiving decisions regarding repair and/or other services, sharing account information, and authorizing billing information for each other.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

In one or more arrangements, teachings of the present disclosure may be implemented with a computing device. FIG. 1 illustrates a block diagram of an example roadside assistance device 100 that may be used in accordance with aspects of the present disclosure. The roadside assistance device 100 is a specialized computing device programmed to perform and carry out the aspects associated with providing enhanced roadside assistance described herein. The roadside assistance device 100 may have a roadside assistance manager 101 configured to perform methods and execute instructions as described herein. The roadside assistance manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the roadside assistance manager 101 may refer to the software (e.g., a computer program or application) and/or hardware used to assign roles and manage roadside assistance for individuals and service providers. Specifically, the roadside assistance manager 101 may be a part of an enhanced roadside assistance system that assigns roles to individuals and facilitates communication related to status updates and service requests among individuals. The one or more specially configured processors of the roadside assistance manager 101 may operate in addition to or in conjunction with another general processor 103 of the roadside assistance device 100. In some embodiments, the roadside assistance manager 101 may be a software module executed by one or more general processors 103. Both the roadside assistance manager 101 and the general processor 103 may be capable of controlling operations of the roadside assistance device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or individual of the roadside assistance device 100 may provide input data. The I/O module 109 may also be configured to be connected to a display device 117, such as a monitor, television, touchscreen, and the like, and may include a graphics card. The display device 117 and input device 115 are shown as separate elements from the roadside assistance device 100, however, they may be within the same structure.

Using the input device 115, system administrators may update various aspects of the roadside assistance system, such as rules or information related to assigning roles to individuals, notifying individuals of assigned roles (e.g., insurance policy holders, drivers, service providers, and the like), providing discounts, and providing information to individuals after a roadside incident. On some roadside assistance devices 100, the input device 115 may be operated by users (e.g., individuals associated with a vehicle, service providers, and/or insurance agents) to interact with the roadside assistance system, including providing and/or receiving driver information, billing and/or account information, service provider preferences, preferences related to how and when to receive notifications from other individuals, service providers, and insurance agents, and the like, as described herein. Meanwhile, the display device 117 may assist system administrators, insurance agents, and/or individuals to confirm/view their inputs.

The memory 113 may be any computer readable medium for storing computer executable instructions (e.g., software). The instructions stored within memory 113 may enable the roadside assistance device 100 to perform various functions. For example, memory 113 may store software used by the roadside assistance device 100, such as an operating system 119 and application programs 121, and may include an associated database 123.

The network interface 111 allows the roadside assistance device 100 to connect to and communicate with a network 130. The network 130 may be any type of network, including a local area network (LAN) and/or a wide area network (WAN), such as the Internet. Through the network 130, the roadside assistance device 100 may communicate with one or more computing devices 140, such as laptops, notebooks, smartphones, personal computers, servers, and the like. The computing devices 140 may include at least some of the same components as roadside assistance device 100. In some embodiments the roadside assistance device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a roadside assistance device 100. In other embodiments, the roadside assistance device 100 may include fewer or more elements. For example, the roadside assistance device 100 may use the general processor(s) 103 to perform functions of the roadside assistance manager 101, and thus, might not include a separate processor or hardware for the roadside assistance manager 101. Additionally, or alternatively, the roadside assistance device 100 may be a mobile device (e.g., a smartphone, tablet, and the like) specially configured to perform or carry out aspects of enhanced roadside assistance described herein, and thus, may also include various other components, such as a battery, speaker, and/or antennas (not shown). Also, the roadside assistance device 100 may be a telematics device and/or a vehicle computing device (either installed by a vehicle manufacturer or as an aftermarket part) having vehicle compatible elements, such as a port for an on-board diagnostic connector or ports for other vehicle sensors (e.g., tire pressure sensors, engine temperature sensors, and the like). For example, the roadside assistance device 100 may be a vehicle's computer or a device plugged into the vehicle's computer for use in vehicle telematics.

Figure 2:
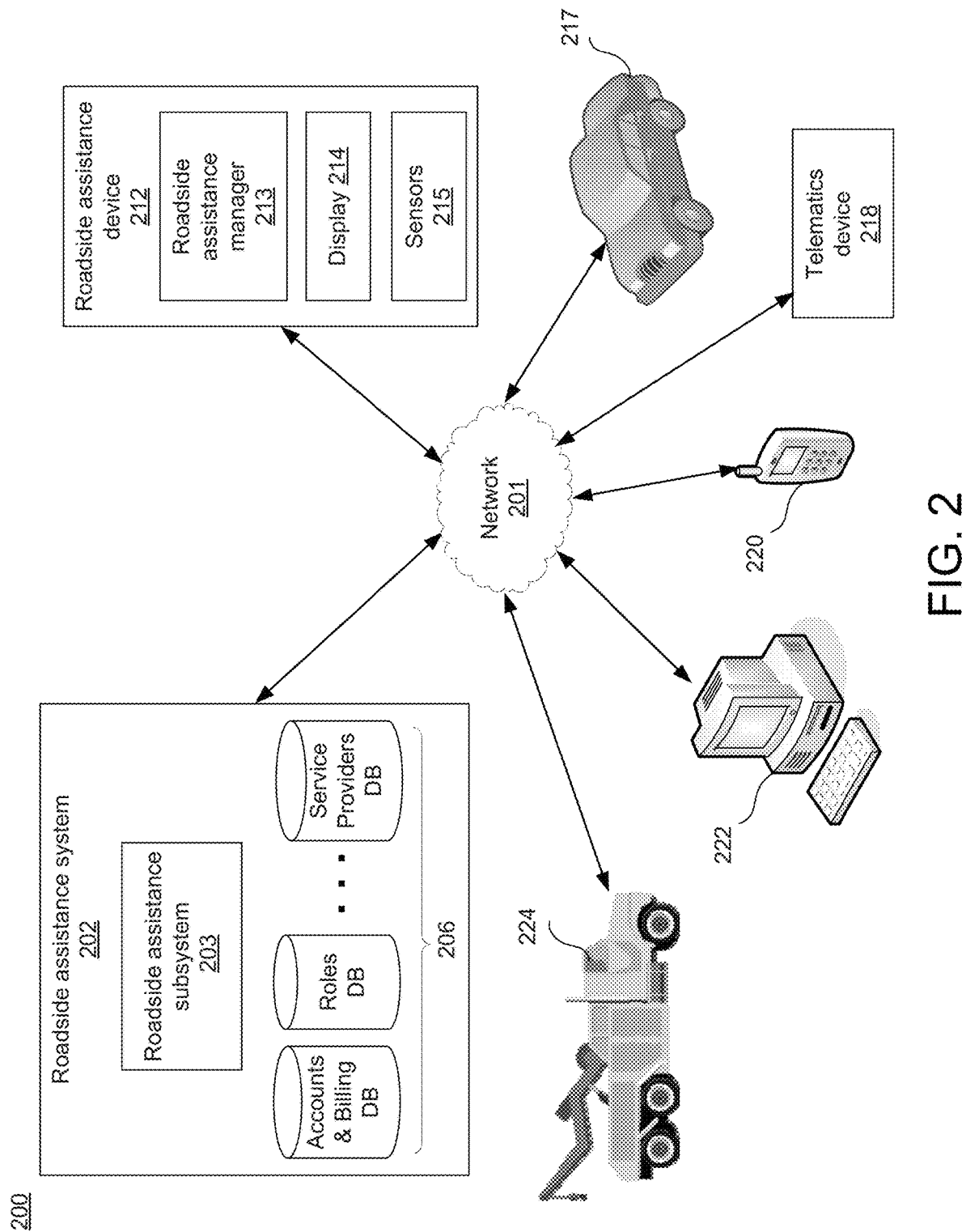
FIG. 2 depicts an example network environment in which various aspects of the present disclosure may be implemented in accordance with one or more example embodiments.

The computerized methods for providing enhanced roadside assistance and assigning roles to individuals and service providers as disclosed herein may be implemented on one or more roadside assistance devices 100 used in various network environments. FIG. 2 illustrates an example network environment 200 for implementing methods in accordance with aspects of the present disclosure.

As shown in FIG. 2, the network environment 200 may include a network 201 configured to connect a roadside assistance system 202, roadside assistance device 212, vehicle 217, telematics device 218, mobile device 220, employee computing device 222, and service providers 224. The roadside assistance device 212 may be the same as or at least similar to the roadside assistance device 100 described above with reference to FIG. 1. Collectively, these specialized computing devices may form at least a part of a roadside assistance system. Although only one of each of the components 212, 217, 218, 220, 222, and 224 are shown in FIG. 2, it is understood that there may be any number of components 212, 217, 218, 220, 222, and 224 in the network environment 200.

The network 201 may be any type of network, like the network 130 described above, and may use one or more communication protocols (e.g., protocols for the Internet (IP), Bluetooth, cellular communications, satellite communications, and the like.) to connect computing devices and servers within the network environment 200 so they may send and receive communications between each other. In particular, the network 201 may include a cellular network and its components, such as cell towers. Accordingly, for example, a mobile device 220 (e.g., a smartphone) or a roadside assistance device 212 of an individual associated with vehicle 217 may communicate, via a cellular backhaul of the network 201, with a roadside assistance system 202 to send driver information for one or more individuals associated with the vehicle 217. In another example, the mobile device 220 or the roadside assistance device 212 of the individual associated with vehicle 217 may communicate, via a cellular backhaul of the network 201, with the roadside assistance system 202 to report a roadside incident or request roadside assistance for the vehicle 217. And, in the opposite direction, the roadside assistance system 202 may communicate, via the cellular backhaul of the network 201, with the mobile device 220 or the roadside assistance device 212 to notify the user (e.g., the individual associated with vehicle 217) of the mobile device 220 or roadside assistance device 212 of a role assignment. In another embodiment, the mobile device 220 and/or roadside assistance device 212 may communicate back and forth with the roadside assistance system 202 over the Internet, such as through a web portal. As shown in FIG. 2, it should be understood that the mobile device 220 or roadside assistance device 212 may connect to the network 201 even if it is removed from the vehicle 217.

The vehicle 217 may be, for example, the vehicle of a driver, individual, or customer of an insurance company or vehicle covered by an insurance policy of an insurance company. In an embodiment, there may be multiple vehicles 217 that are covered by an insurance policy of one individual. Although FIG. 2 illustrates only one vehicle 217, the roadside assistance system may be configured to communicate with multiple vehicles 217 simultaneously (e.g., at or around the same time), wherein multiple vehicles 217 may be associated with multiple individuals. The roadside assistance system 202 may receive driver information simultaneously, assign roles to different individuals simultaneously, and notify individuals of assigned roles simultaneously. Also, although FIG. 2 depicts the vehicle 217 as a car, the vehicle 217 may be any type of vehicle, including a motorcycle, bicycle, scooter, drone (or other automated device), truck, bus, boat, plane, helicopter, and the like.

In an embodiment, there may be one or more individuals associated with the vehicle 217. An individual associated with the vehicle 217 may include a parent, guardian, child (e.g., teenager), relative, or family friend associated with the vehicle. For example, an individual may be associated with the vehicle 217 if the individual is an owner of the vehicle 217 and/or has access and/or permission to drive the vehicle 217. For example, a parent may be the owner of the vehicle 217, and a teenager may have access and/or permission from the parent to drive the vehicle 217. Thus, both the parent and the teenager may be individuals associated with the vehicle 217. Additionally or alternatively, an individual may be associated with the vehicle 217 if the individual is identified (e.g., as a driver) on an insurance policy that insures the vehicle 217. For example, a parent may be the policy holder of an insurance policy and registered in a roadside assistance account, and a teenager may be listed as a driver of the vehicle 217 on the insurance policy. Thus, the teenager may be covered by insurance and considered as an individual associated with the vehicle 217 for coverage in a roadside assistance service or program.

An individual associated with the vehicle 217 may also be associated with and operate a roadside assistance device 212. In an embodiment, the roadside assistance device 212 may be a specialized mobile device, a tablet, laptop, personal computer, and the like configured to perform or carry out aspects associated with enhanced roadside assistance described herein. For example, the roadside assistance device 212 may be the same as the mobile device 220 depicted in FIG. 2. The roadside assistance device 212 may belong to a driver, individual, or customer of an insurance company who is enrolled in a roadside assistance service. Although only one roadside assistance device 212 is illustrated in FIG. 2, there may be any number of roadside assistance devices 212, wherein each roadside assistance device 212 is associated with at least one individual. The roadside assistance device 212 may further comprise a roadside assistance manager 213, a display 214, and sensors 215. In the case of a roadside assistance device 212 that is installed in or connected to a vehicle, the individual is considered to operate that roadside assistance device by performing the installation or connection of that device in or at the vehicle.

The roadside assistance device 212 may be configured to execute the roadside assistance manager 213 that presents a user interface (e.g., a graphical user interface for a website, application, software program, and the like) on the display 214. The display 214 may comprise a monitor, television, touchscreen, and the like. The user interface of the roadside assistance manager 213 may allow individuals to send driver information, receive notifications of assigned roles, submit service requests, and send and receive status updates as provided by the roadside assistance system 202. The roadside assistance manager 213 may be a self-sufficient program or may be a module of another program, such as a program used to collect and/or evaluate driver information representing actions of a vehicle 217, driving behavior of a driver or individual associated with a vehicle 217, and/or status updates of a vehicle 217. The roadside assistance manager 213 may have access to driving data that is collected by the sensors 215 of the roadside assistance device 212. The sensors 215 may comprise various sensors and/or modules that detect driving behaviors, environmental information, and/or other risk-related factors of a driver of a vehicle 217. For example, the sensors 215 may comprise an accelerometer, GPS, gyroscope, and the like. In an embodiment, the sensors 215 may detect risk-related factors that may result in a roadside incident involving the vehicle 217.

In an embodiment, the roadside assistance manager 213 may be downloaded or otherwise installed onto the roadside assistance device 212 using known methods. Different devices may install different versions of the roadside assistance manager 213 depending on their platform. For example, a roadside assistance device 212 (e.g., a smartphone) running the iOS™ operating system may download a different version of the roadside assistance manager 213 than a roadside assistance device 212 running the ANDROID™ operating system.

An individual may launch the roadside assistance manager 213 by, for example, operating buttons or a touchscreen on the roadside assistance device 212. Additionally, or alternatively, the roadside assistance device 212 may be configured to execute a web browser (e.g., an application for accessing and navigating the Internet) to access a web page providing an interface for the roadside assistance system. In some embodiments, the roadside assistance device 212 may also be configured to collect information, such as driving data. For example, the roadside assistance manager 213 or another program installed on the roadside assistance device 212 may instruct the roadside assistance device 212 to collect driving data using the sensors 215 (e.g., its accelerometer, GPS, gyroscope, and the like). Driving data may include vehicle telematics data or any other data related to events occurring during a vehicle's trip (e.g., an impact to a part of the vehicle, a deployed airbag, and the like). Driving data may also include location information, such as GPS coordinates, indicating the geographical location of the roadside assistance device 212. The roadside assistance manager 213 or another program installed on the roadside assistance device 212 may submit driving data and driver information of one or more individuals associated with the vehicle 217 and assign roles to the one or more individuals based on the driver information.

An individual associated with the vehicle 217 and associated with the roadside assistance device 212 may employ the roadside assistance manager 213 to send and/or access at least one of roadside assistance requests, incident details, messages, status updates, account information, and settings/preferences related to the vehicle 217. In order to employ the roadside assistance manager 213 (e.g., and/or communicate with the roadside assistance system 202), an individual associated with the vehicle 217 might not need to be a driver of the vehicle 217. In an embodiment, a parent may be associated with the vehicle 217, but might not actually drive the vehicle 217. For example, the vehicle 217 may have been purchased by a teenager (or parent) and may only be driven by the teenager, but the vehicle 217 may be insured on the parent's insurance policy. Thus, the parent may be able to send driver information, report a roadside incident, and/or request roadside assistance for the vehicle 217 through the roadside assistance manager 213 even though the teenager is the one driving the vehicle 217. Additionally or alternatively, the teenager may be able to send driver information, report a roadside incident, and/or request roadside assistance for the vehicle 217 through the roadside assistance manager 213 even though the parent is the one driving the vehicle 217. Ultimately, any of the one or more individuals associated with the vehicle 217 may use the roadside assistance manager 213 through a respective roadside assistance device 212 to access roadside assistance and communicate with each other, with insurance agent(s), and/or with service provider(s).

Additionally, FIG. 2 also illustrates a telematics device 218 connected to the network 201. In an embodiment, the telematics device 218 may be referred to as a vehicle computing device that is associated with the vehicle 217 and the mobile device 220. In some embodiments, the mobile device 220 and telematics device 218 may communicate with one another (e.g., via Bluetooth). The mobile device 220 may be any mobile device (e.g., a smartphone, tablet, and the like) that is associated with an individual or passenger of the vehicle 217. In particular, the mobile device 220 may belong to an individual associated with the vehicle 217, wherein the individual is a customer of an insurance company and enrolled in a service that allows the individual to participate in roadside assistance services. The mobile device 220 may be configured similarly to the roadside assistance device 212 and may interface with the telematics device 218.

The telematics device 218 may be configured to execute a roadside assistance manager that presents a user interface for a customer to provide inputs to and receive outputs from the roadside assistance system 202. The roadside assistance manager 213 may be downloaded or otherwise installed onto the telematics device 218 using known methods. Once installed onto the telematics device 218, an individual may launch the roadside assistance manager 213 by, for example, operating buttons or a touchscreen on the dashboard of the vehicle 217. Additionally, or alternatively, the telematics 218 may be configured to execute a web browser to access a web page providing an interface for the roadside assistance system 202.

In some embodiments, the telematics device 218 may be a device that is plugged into the vehicle's 217 on-board diagnostic (OBD) system (e.g., plugged in through an OBD II connector) or otherwise installed in the vehicle 217 in order to collect driving data using, e.g., its accelerometer, GPS, gyroscope, or any other sensor (either in the telematics device 218 or the vehicle 217). As mentioned above, this driving data may include vehicle telematics data or any other data related to events occurring during a vehicle's trip (e.g., an impact to a part of the vehicle 217, a deployed airbag, or other event triggered by a sensor 215 of the vehicle 217). The vehicle 217 may have a GPS installed therein, and therefore, the telematics device 218 may also collect GPS coordinates.

Further, the telematics device 218 may include multiple devices. For example, the telematics device 218 may include the vehicle's OBD system and other computers of the vehicle 217. The telematics device 218 may be configured to interface with one or more vehicle sensors (e.g., fuel gauge, tire pressure sensors, engine temperature sensors, and the like). The telematics device 218 may also interface with the mobile device 220 via a wired connection (e.g., USB, OBD II connector, and the like) or a wireless connection (e.g., Bluetooth). In some embodiments, there might not be a telematics device 218 installed in the vehicle 217 that is configurable to interface with the roadside assistance system 202, or the telematics device 218 might not be able to communicate with the mobile device 220. Still, in some cases, the telematics device 218 might be configured so that it only communicates with the mobile device 220 within the same vehicle 217.

In an embodiment, both a telematics device 218 and a mobile device 220 (or a roadside assistance device 212) may be employed, whereas in another embodiment, only one of these devices may be used with the roadside assistance system to collect driving data. For example, an individual associated with the vehicle 217 may choose whether he or she wishes to use his or her mobile phone to capture driving data or whether he or she wishes to have a device plugged into the vehicle 217 to collect driving data.

FIG. 2 also illustrates an employee computing device 222 and a service provider 224. Although only one employee computing device 222 and service provider 224 are shown in FIG. 2, there may be any number of employee computing devices 222 and service providers 224 in the network environment 200. The employee computing device 222 is shown as a separate element from the roadside assistance system 202; however, the employee computing device 222 may be a part of or within the roadside assistance system 202. The employee computing device 222 may be any computing device used by an employee (e.g., insurance agent, system administrator, and the like) of an insurance company to access the roadside assistance system 202. For example, an insurance agent may use the employee computing device 222 to communicate with an individual associated with the vehicle 217 and the roadside assistance device 212 through the roadside assistance system 202. In an embodiment, an individual associated with the vehicle 217 and the roadside assistance device 212 may be able to communicate with an insurance agent at the employee computing device 222 by accessing the roadside assistance manager 213. The insurance agent at the employee computing device 222 may have access to driver information, account information, billing information, and service provider information through the roadside assistance system 202.

The service provider 224 may represent one or more service providers 224 that are partnered with an insurance company offering roadside assistance. For example, the insurance company may work with particular service providers 224 (e.g., businesses, companies, entities, and the like) that provide services to customers. In some embodiments, a service provider 224 may access the roadside assistance system 202 through a computing device, such as a personal computer, laptop, mobile device, tablet, and the like (e.g., roadside assistance device 100). Each service provider 224 may use a corresponding computing device to communicate with individuals and/or insurance agents through the roadside assistance system 202. The roadside assistance system 202 may allow service providers 224 to provide various services, benefits, and/or discounts to individuals. In some embodiments, service providers 224 may provide services to drivers or individuals after a roadside incident. A roadside incident may comprise a car accident, any incident that leaves a driver or individual stranded on the side of the road, or any incident that leaves a vehicle in need of repair or service. In another embodiment, service providers 224 may provide services to drivers or individuals at any time upon request. For example, the individual might not need to have been in an accident or have experienced a roadside incident in order to submit a service request for a particular type of service from a service provider 224.

Different service providers 224 may provide different types of services, such as repair services, transportation services, medical services, lodging services, and food services. Repair services may include towing, winching, jump starting, changing tire(s), delivering gas, unlocking locked vehicles, and the like. For example, the vehicle 217 may land in a ditch during a roadside incident, and an individual associated with the vehicle 217 may need a service provider 224 to provide winching in order to pull the vehicle 217 out from the ditch. In another example, the vehicle 217 may run out of gas on the road, and an individual associated with the vehicle 217 may need a service provider 224 to deliver gas. Repair services may also include services provided at a repair shop, such brake repair, engine repair, oil changes, wheel alignment, tire mounting and rotation, transmission service, and the like. Transportation services may include providing alternative transportation to an individual associated with the vehicle 217 that is unable to be driven. For example, an individual associated with the vehicle 217 may have been involved in a roadside incident, such as a car accident, and may need major repair to fix the vehicle 217. Thus, service providers 224 may tow the vehicle 217 to a repair shop and offer transportation services, such as rental cars, taxis, ridesharing services, or other forms of transportation, to stranded drivers or individuals. Service providers 224 may also offer medical services to individuals who have been involved in serious or major car accidents. Medical services may include emergency assistance, emergency medical services, ambulatory care, healthcare treatments, consultations, and the like. Service providers 224 who offer medical services may include service dispatchers, emergency operators, hospital personnel, and the like.

Lodging services, such as hotel services, may also be offered by service providers 224 to stranded drivers or individuals. For example, an individual associated with the vehicle 217 may be involved in a roadside incident while traveling far from home, wherein the vehicle 217 may necessitate repairs from a local repair shop. In some cases, the roadside incident may occur at night, and the local repair shop might not be open until later (e.g., the next day). In another case, the local repair shop may be open but might not be able to repair the vehicle 217 until later (e.g., until the next day or until another period of time). Thus, a service provider 224 may offer lodging, such as a hotel stay, to an individual who may be waiting for car repair. Service providers 224 may also offer food services to an individual associated with the vehicle 217. In an embodiment, the individual may be involved in a roadside incident and may be waiting for repair for hours or another period of time. For example, the individual may be waiting at the site of the roadside incident, at a nearby location, or at a repair shop, and may wish to order a pizza or other food while waiting for service. The individual may request a food delivery from a service provider 224 (e.g. from the same service provider 224 providing repair services or from a different service provider 224) while waiting for car repair or while waiting for a tow truck to arrive on site. The service provider 224 may deliver food as requested by the individual based on the individual's location. In some cases, the service provider 224 may deliver food to a location provided by the individual.

Individuals may employ multiple services from one or more different service providers 224 at a time. That is, a service provider 224 may provide a single type of service or multiple types of services. For example, an individual may request food delivery service while waiting for repair of the vehicle 217 at the repair shop, wherein the food delivery service and the repair service may be provided by the same service provider 224 or different service providers 224. In another example, an individual may request food delivery service while staying at a hotel provided by the service provider 224 (e.g., lodging services) and while waiting for a repair of the vehicle 217 to be completed (e.g., repair services), wherein each service may be provided by the same service provider 224 or different service providers 224. Furthermore, the different types of services offered by the service providers 224 may be compensated for by the insurance company. In an embodiment, the individual who requests a specific service might not need to pay for the service (e.g., repair service, transportation service, medical service, lodging service, and food service) or may receive a discounted price for the service. For example, an individual associated with the vehicle 217 may order a pizza via food services, wherein the pizza is paid for by the insurance company or by the service provider 224. In another example, an individual associated with the vehicle 217 may receive a free hotel stay or a discounted hotel stay (e.g., 50% off daily rate) while waiting for a car repair.

An individual associated with the vehicle 217 may receive additional discounts for other types of service offered by a service provider 224 based on services previously requested by the individual. For example, if an individual requests service for a flat tire, a service provider 224 may provide a discount or a coupon for a free tire rotation with the purchase of a new tire from the service provider 224. In another example, the service provider 224 may provide discounts that are specific to the type of vehicle 217 (e.g., a vehicle make, a vehicle model). The individual may select a service provider 224 based on the discounts or coupons provided. Compensation or discounts for different types of services may be a benefit or advantage given to individuals with a certain type of insurance policy or to individuals who are signed up for a specific type or level of roadside assistance program or service offered by the insurance company. Furthermore, individuals may rate service providers 224 based on the quality of service provided, the timeliness of the service provider 224, the price of the service, and the like. By providing different types of services, the service providers 224 may offer beneficial roadside assistance to individuals after a roadside incident. Furthermore, the roadside assistance system 202 may allow one or more individuals associated with roadside assistance device 212 or mobile device 220, insurance agents at employee computing devices 222, and service providers 224 to communicate with each other to obtain and/or provide roadside assistance for the vehicle 217.

FIG. 2 also illustrates example subsystems within the network environment 200. That is the roadside assistance system 202 may comprise a roadside assistance subsystem 203 and a plurality of databases 206. The roadside assistance subsystem 203 may include one or more application servers, computing devices, and other equipment used by company (e.g., insurance company) personnel to implement and provide the enhanced roadside assistance services described herein. For example, the roadside assistance subsystem 203 may include a role assignment module that is configured with programmed instructions to assign a role to each individual associated with the vehicle 217 based on driver information and to notify each individual of the role assignment. For example, the role assignment module may update a role assignment associated with a roadside assistance account. The role assignment module may associate the role assignment with the roadside assistance account by identifying an account number or another unique identifier for the account. The role assignment may be stored as a role assignment record in a database (e.g., database 206) of the roadside assistance system 202, wherein the role assignment record may be associated with driver or customer records stored in the database. For example, the role assignment record may identify a unique identification number for a driver or customer. In another example, the role assignment record may include a role field for each associated driver or customer. The role assignment module may update the role assignment by inserting a role identifier in the role field.

The role assignment module may also be configured with programmed instructions to assign a service provider role to each service provider offering specific types of services. For example, the role assignment module may update a service provider role assignment associated with a roadside assistance account. The role assignment module may associate the service provider role assignment with the roadside assistance account by identifying an account number or another unique identifier for the account. The service provider role assignment may be stored as a service provider role assignment record in a database (e.g., database 206) of the roadside assistance system 202, wherein the service provider role assignment record may be associated with driver or customer records stored in the database. For example, the service provider role assignment record may identify a unique identification number for a service provider. In another example, the service provider role assignment record may include a role field for each associated service provider. The role assignment module may update the service provider role assignment by inserting a role identifier in the role field. Further, the roadside assistance subsystem 203 may comprise a plurality of service modules, which may be configured with programmed instructions to provide service provider information for each type of service offered (e.g., repair services, transportation services, lodging services, medical services, and food services) and configured with programmed instructions to provide corresponding interfaces to users or individuals. The roadside assistance subsystem 203 may also provide access and also keep track of records related to role assignments of individuals, roadside incidents, service requests, and previous maintenance records.

The roadside assistance subsystem 203 may include functionality that may be distributed among a plurality of computing devices. For example, the roadside assistance subsystem 203 may comprise further subsystems, including client-side subsystems and server-side subsystems. The client-side subsystem may interface with the roadside assistance device 212, telematics device 218, and/or mobile device 220, whereas the server-side subsystem may interface with application servers and computing devices (e.g., employee computing device 222) which handle a variety of tasks related to the assignment of roles and management of roadside assistance services.

The subsystems, application servers, and computing devices of the roadside assistance subsystem 203 may also have access to the plurality of databases 206. In an embodiment, the plurality of databases 206 may be incorporated into the roadside assistance subsystem 203 or may be separate components in the roadside assistance subsystem 203. As an example, the plurality of databases 206 may comprise an accounts and billing database, a roles database, a service provider database, and other databases. A database 206 may comprise information regarding at least one of the assignment of roles, driver information, account and billing information, service providers, roadside incidents, service requests, or previous maintenance records. For example, a database 206 may store a record of previous roadside incidents, service requests, and maintenance records. In an embodiment, the roadside assistance subsystem 203 may use the information stored in the plurality of databases 206 to send reminders to individuals regarding future services (e.g., reminders regarding oil changes, tire rotations, and the like). The data stored in the plurality of databases 206 may be collected and compiled by the roadside assistance device 212, the telematics device 218, the roadside assistance subsystem 203, the employee computing device 222, or by servers and subsystems within the roadside assistance subsystem 203.

Figure 3:
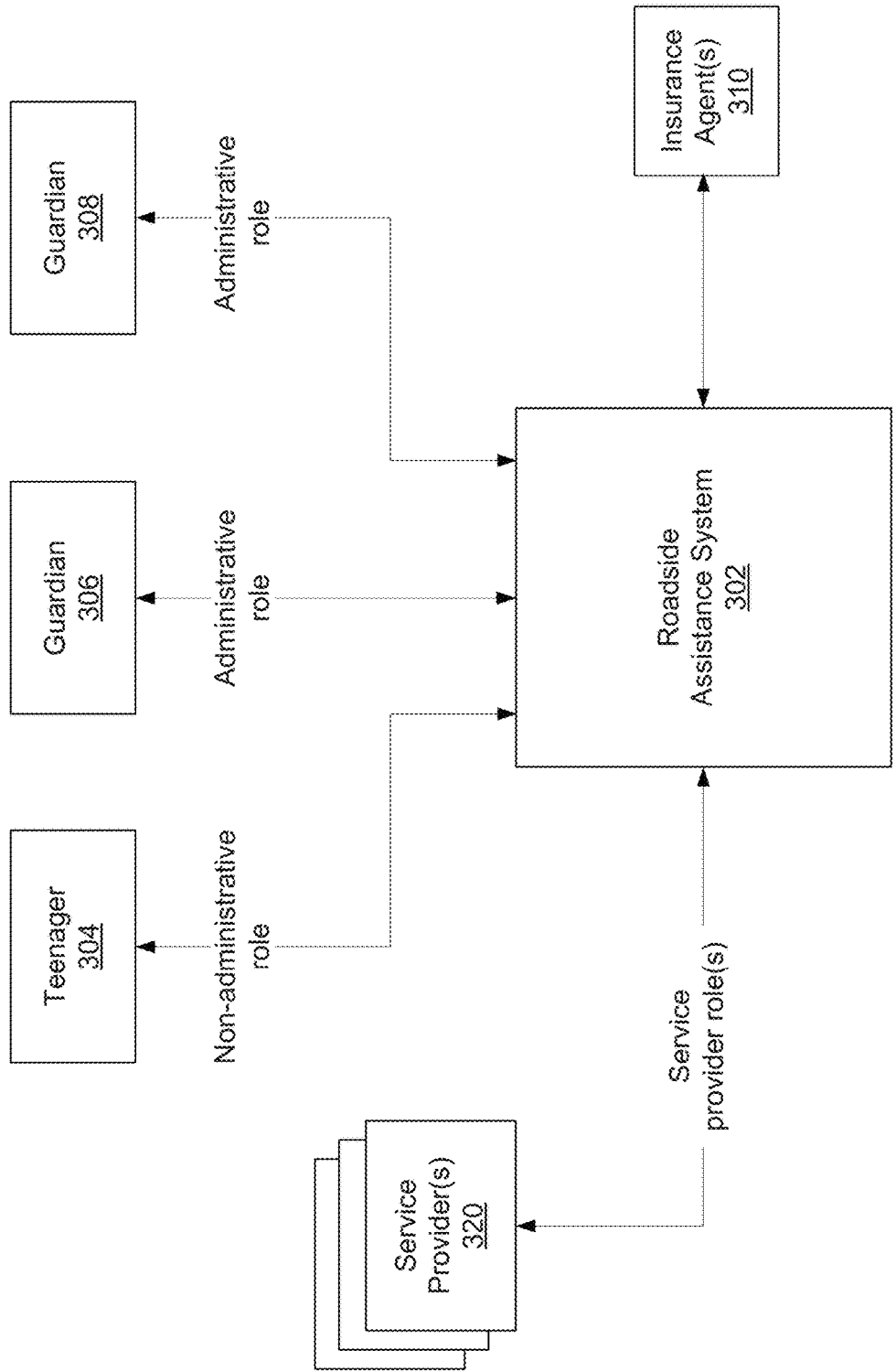
FIG. 3 depicts a block diagram of an example of role assignment for roadside assistance in accordance with one or more example embodiments.

FIG. 3 illustrates a block diagram of an example of role assignment for roadside assistance in accordance with aspects of the present disclosure. Specifically, FIG. 3 illustrates examples of assigned roles and communication between a teenager 304, a first guardian 306, a second guardian 308, one or more service providers 320, a roadside assistance system 302, and one or more insurance agents 310. The roadside assistance system 302 and one or more service providers 320 may be the same as or at least similar to the roadside assistance system 202 and the service providers 224, respectively, as illustrated in FIG. 2. The one or more service providers 224 may communicate with the roadside assistance system through a computing device, such as roadside assistance device 100. Additionally, teenager 304 and guardians 306 and 308 may be associated with the vehicle 217 and may each communicate with each other, the one or more service providers 320, the one or more insurance agents 310, and the roadside assistance system 302 by one or more of the roadside assistance device 212, telematics device 218, and/or mobile device 220. An insurance agent 310 may be the same as the insurance agent associated with the employee computing device 224 as illustrated in FIG. 2.

In an embodiment, the teenager 304 and guardians 306 and 308 may be associated with the same vehicle, such as vehicle 217. For example, the teenager 304 and guardians 306 and 308 may represent a family that has a family vehicle. The family may also comprise one or more additional individuals with access and/or permission to drive the family vehicle. In some embodiments, the teenager 304 and guardians 306 and 308 may be associated with multiple vehicles. That is, there may be multiple vehicles owned within the family. For example, multiple vehicles may be owned by one or more individuals in the family. Each vehicle may be covered under one insurance policy in an account (e.g., insurance account, roadside assistance account) with the insurance company, wherein the account holder may be one of the teenager 304, first guardian 306, and second guardian 308. In some cases, the first guardian 306 or the second guardian 308 may be the account holder or policy holder of the insurance policy and registered in a roadside assistance account, wherein the teenager 304 and guardians 306 and 308 may be listed as drivers of the vehicle on the insurance policy. Thus, the teenager 304 and guardians 306 and 308 may be covered by insurance and each considered as an individual associated with the vehicle for coverage in a roadside assistance service or program.

The roadside assistance system 302 may receive, from various computing devices operated by these individuals, driver information for the teenager 304 and guardians 306 and 308 and modify the role assignment for the roadside assistance account by assigning a role to each based on the driver information. The driver information may include at least one of a name, an age, a driver's license number, a driving record, a vehicle make, a vehicle model, an insurance policy number, and the like for each individual. This driver information may be obtained by the roadside assistance system or by an insurance agent 310 during an initial registration of an insurance account or roadside assistance account. In an embodiment, one or more insurance agents 310 may be able to access the roadside assistance system 302, assign roles, and/or view/modify account information. The roadside assistance system 302 may employ subsystems (e.g., roadside assistance subsystem 203), application servers, and computing devices to determine role assignments based on the driver information. In some cases, different types of roles may be assigned to individuals based on account holder information, age, driving records, and the like. For example, the roadside assistance system 302 may assign administrative roles and non-administrative roles to individuals.

As illustrated in FIG. 3, the first guardian 306 and the second guardian 308 may each be assigned an administrative role, whereas the teenager 304 may be assigned a non-administrative role. An administrative role may allow an individual (e.g., a parent, a guardian, and the like) to access and/or modify one or more settings for a roadside assistance account, such as one or more of billing information, account information, and preferences for the roadside assistance account. For example, the administrative role may permit the first guardian 306 and the second guardian 308 to designate one or more service providers (e.g., as preferences) to repair the vehicle after a roadside assistance. A non-administrative role may allow an individual to utilize the roadside assistance service and communicate with other individuals to obtain service. For example, the non-administrative role may permit the teenager 304 to communicate with the guardians 306 and 308, one or more insurance agents 310, and/or one or more service providers 320 to obtain service for a vehicle after a roadside incident. The non-administrative role may also prevent an individual, such as the teenager 304, from modifying one or more settings for the roadside assistance account that are set by an administrator (e.g., the first guardian 306 and/or the second guardian 308 with administrative role(s)).

For example, the first guardian 306 and/or the second guardian 308 may set up account information, along with billing information and preferences for the roadside assistance account, wherein this information might not be modified by the teenager 304. Billing information may include one or more bank accounts, credit cards, and the like, whereas preferences may include preferred service providers 320 and access levels or privileges assigned to individuals of non-administrative roles (e.g., teenager 304). In an embodiment, the first guardian 306 and/or the second guardian 308 may designate specific service providers 320 to provide services for individuals associated with the vehicle. For example, the first guardian 306 and/or the second guardian 308 may prefer for a designated service provider 320 to repair the vehicle. Thus, the teenager 304 may be obligated to take the vehicle to the designated service provider after a roadside incident. The first guardian 306 and/or the second guardian 308 may authorize a repair for the vehicle after a roadside incident by sending an indication to the roadside assistance system 302, wherein the indication identifies a service provider 320 to repair the vehicle and billing information to pay for the repair. In another embodiment, the first guardian 306 may authorize the teenager 304 to pay for the repair using his bank account or credit card information.

Additionally, the roadside assistance system 302 may assign service provider roles to one or more service providers 320. The roadside assistance system 302 may assign different service provider roles to each service provider 320 based on the type of service that the service provider 320 offers. For example, a service provider 320 that offers repair services may be assigned a repair service provider role, whereas service provider 320 that offers food services may be assigned a food service provider role. In some embodiments, a service provider 320 that offers multiple services may be assigned multiple service provider roles. The assignment of service provider roles may allow the roadside assistance system 302 to determine which specific service providers 320 may provide services as requested by individuals. For example, an individual, such as the second guardian 308, may experience a roadside incident that necessitates repair to the vehicle. The second guardian 308 may submit a service request (e.g., via roadside assistance device 212, telematics device 218, or mobile device 220) to the roadside assistance system 302, wherein the service request indicates one or more types of services needed. For example, the second guardian 308 may request repair services through a service request. The roadside assistance system 302 may identify one or more service providers 320 that offer the requested service and assign a service provider role (e.g., a repair service provider role) to the one or more service providers 320. Based on the assigned service provider roles, the roadside assistance system 302 may notify the one or more service providers 320 of the request, so that the request may be filled by a certain service provider 320 (e.g., a selected service provider 320) in a timely manner.

By employing the roadside assistance system 302, the second guardian 308 may be able to communicate with other individuals (e.g., the teenager 304, the first guardian 306), one or more service providers 320, and one or more insurance agents 310 through a computing device (e.g., via group chat or group messaging platform). The second guardian 308 may provide details regarding the roadside incident to the other individuals, such as how the roadside incident occurred, the location of the roadside incident, the condition of the vehicle, and other details. Other individuals, service providers, and insurance agents may communicate instructions for repair or offer help or assistance. The one or more service providers 320 may communicate one or more status updates, price quotes, and discounts for service(s) to repair the vehicle. In some embodiments, the insurance agent 310 may have access to the roadside assistance system 302 and may be able to interact with and provide insurance-specific information to the teenager 304, the first guardian 306, the second guardian 308, and/or the one or more service providers 320.

Figure 4:
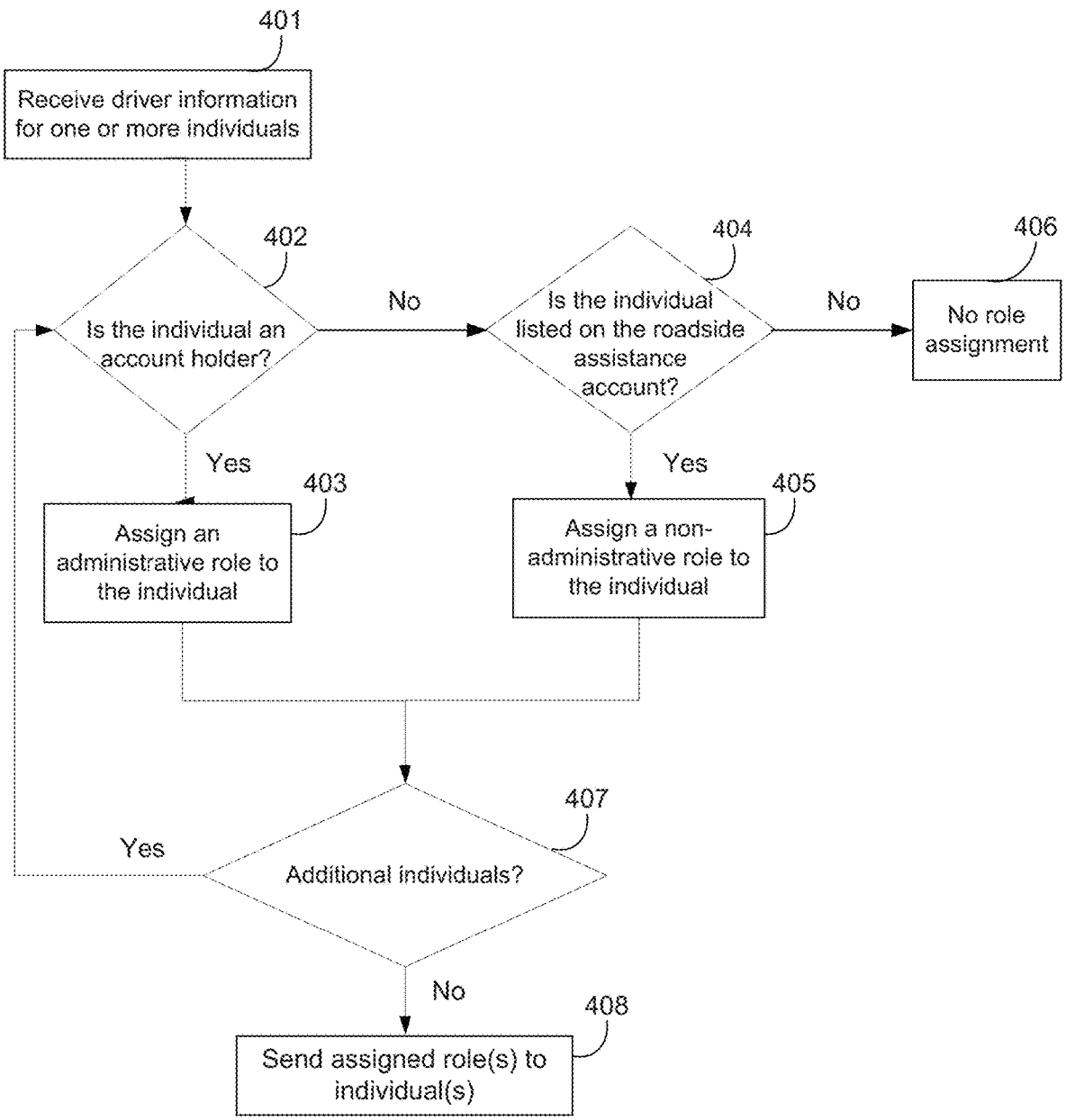
FIG. 4 depict a flow diagram of example method steps for assigning roles to individuals for roadside assistance in accordance with one or more example embodiments.

FIG. 4 illustrates a flow diagram of an example method in accordance with aspects of the present disclosure. In particular, FIG. 4 illustrates example method steps for assigning a role to each individual associated with a vehicle that is registered in a roadside assistance account. The steps of FIG. 4 may be performed by subsystems, application servers, and computing devices of the roadside assistance system 202 (e.g., roadside assistance subsystem 203). One or more of the steps of FIG. 4 may be performed by executing a roadside assistance program (e.g., a roadside assistance mobile application) and/or operating a particularly configured computing device of the roadside assistance system 202. As a result of the method of FIG. 4, an individual at roadside assistance device 212 and associated with vehicle 217, may be assigned a role and notified of the assigned role.

The method of FIG. 4 may begin with a step 401 of receiving driver information for one or more individuals. For example, the roadside assistance system 202 may receive driver information for one or more individuals from the roadside assistance device 212, telematics device 218, and/or mobile device 220. The one or more individuals may comprise at least one of a teenager 304, first guardian 306, second guardian 308, or other individuals associated with a vehicle 217. Furthermore, driver information may be received for one or more individuals after registering for the roadside assistance service or program. For example, the one or more individuals may sign up for the roadside assistance service and provide driver information, such as least one of a name, an age, a driver's license number, a driving record, a vehicle make, a vehicle model, and an insurance policy number. At step 402, the roadside assistance system may determine if an individual (e.g., a first individual out of the one or more individuals) is an account holder. In another embodiment, at step 402, the roadside assistance system may determine if the individual is an owner of the vehicle associated with the insurance policy number. If the individual is the account holder of the roadside assistance account and/or the owner of the vehicle associated with the insurance policy number, then the method in this example proceeds to step 403.

At step 403, the roadside assistance system may assign an administrative role to the individual. The administrative role assigned to the individual may include a set of privileges that permit modification of one or more settings for the roadside assistance account. If the individual is not the account holder of the roadside assistance account, then the example method proceeds to step 404, wherein the roadside assistance system may determine if the individual is listed on the roadside assistance account. For example, the individual might not be the account holder of the roadside assistance account, but the individual may be associated with an insurance policy number listed on the account. If the individual is listed on the roadside assistance account, then the example method proceeds to step 405, wherein the roadside assistance system may assign a non-administrative role to the individual. The non-administrative role assigned to the individual may include a set of privileges that do not permit modification of one or more settings for the roadside assistance account.

If the individual is not listed on the roadside assistance account, then the example method proceeds to step 406, wherein the roadside assistance system might not assign a role to the individual. For example, the individual might not be covered by the insurance policy or might not be given access to the roadside assistance service by the account holder. Thus, no role may be assigned to the individual. In such cases, driver information for the individual may be removed from the roadside assistance system automatically or manually by an insurance agent (e.g., insurance agent 310). From steps 403 and 405, the example method proceeds to step 407, wherein the roadside assistance system may determine if there are any additional individuals. For example, the roadside assistance system may receive driver information for one or more individuals at step 401, and steps 402-406 of the example method may be directed to assigning a role to a first individual out of the one or more individuals. At step 407, the roadside assistance system may determine if there are additional individuals for which driver information has been received (e.g., a second individual, a third individual, a fourth individual, and the like). If there are additional individuals for which driver information has been received, then the example method proceeds to step 402, wherein the roadside assistance system may determine if a second individual is an account holder, and so forth. The roadside assistance system may repeat steps 402-406 of the example method until assignment of roles for all of the individuals have been determined or at least attempted (e.g., such as for the individuals who are not assigned any roles at step 406).

After the roles (or lack of roles thereof) have been determined for the one or more individuals (e.g., a first individual, a second individual, and the like), the example method proceeds to step 408, wherein the roadside assistance system may send a notification regarding the assigned roles to the respective computing devices operated by each of the one or more individuals. In some embodiments, the roadside assistance system may receive driver information from multiple individuals at a time, assign a role to each of the multiple individuals simultaneously, and notify each of the multiple individuals of the assigned roles simultaneously. That is, the roadside assistance system may proceed through the steps 401-408, while performing steps with respect to the multiple individuals simultaneously.

Figure 5A:
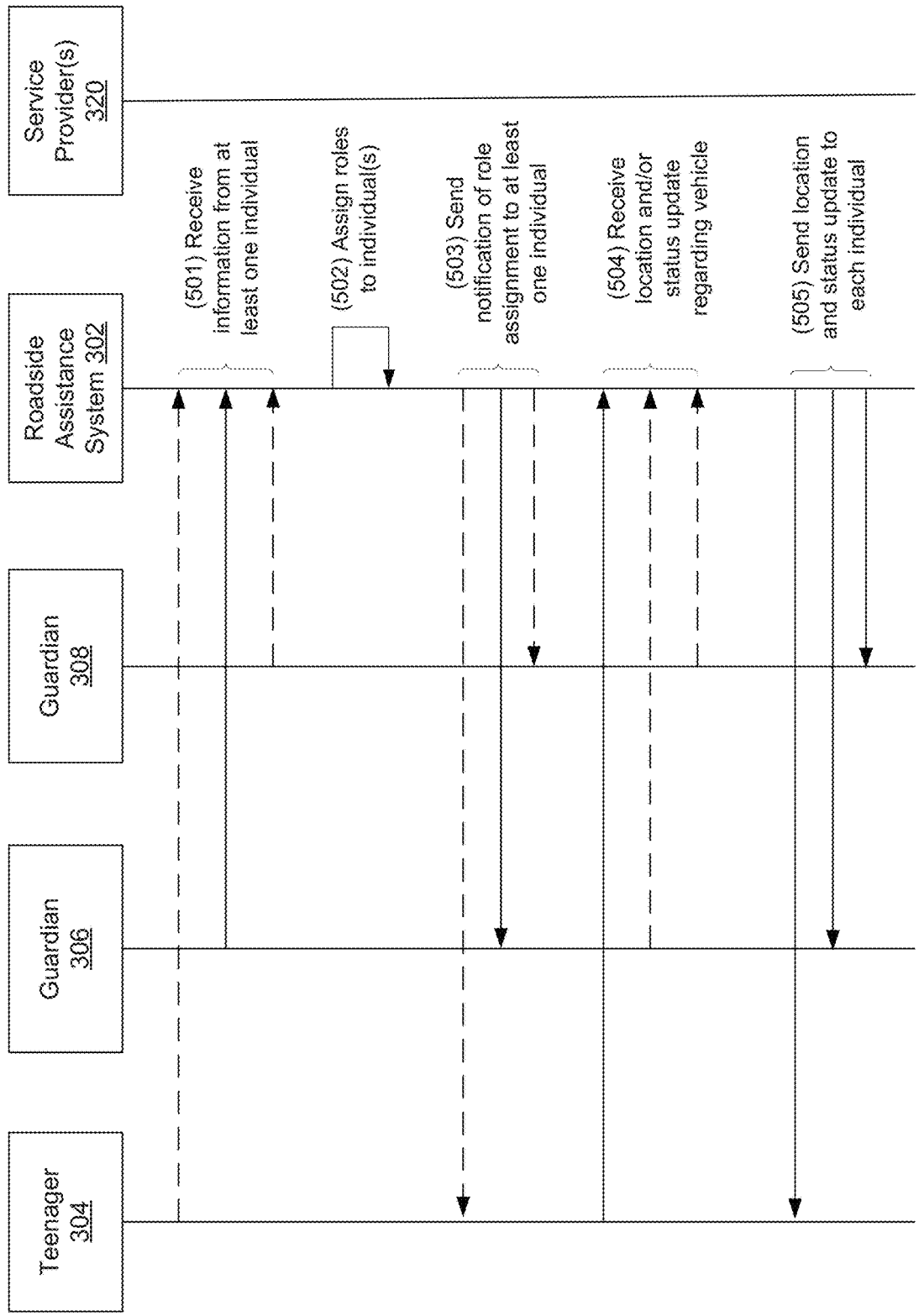
FIGS. 5A and 5B depict an illustrative event sequence for assigning roles and providing roadside assistance for individuals in accordance with one or more example embodiments.
Figure 5B:
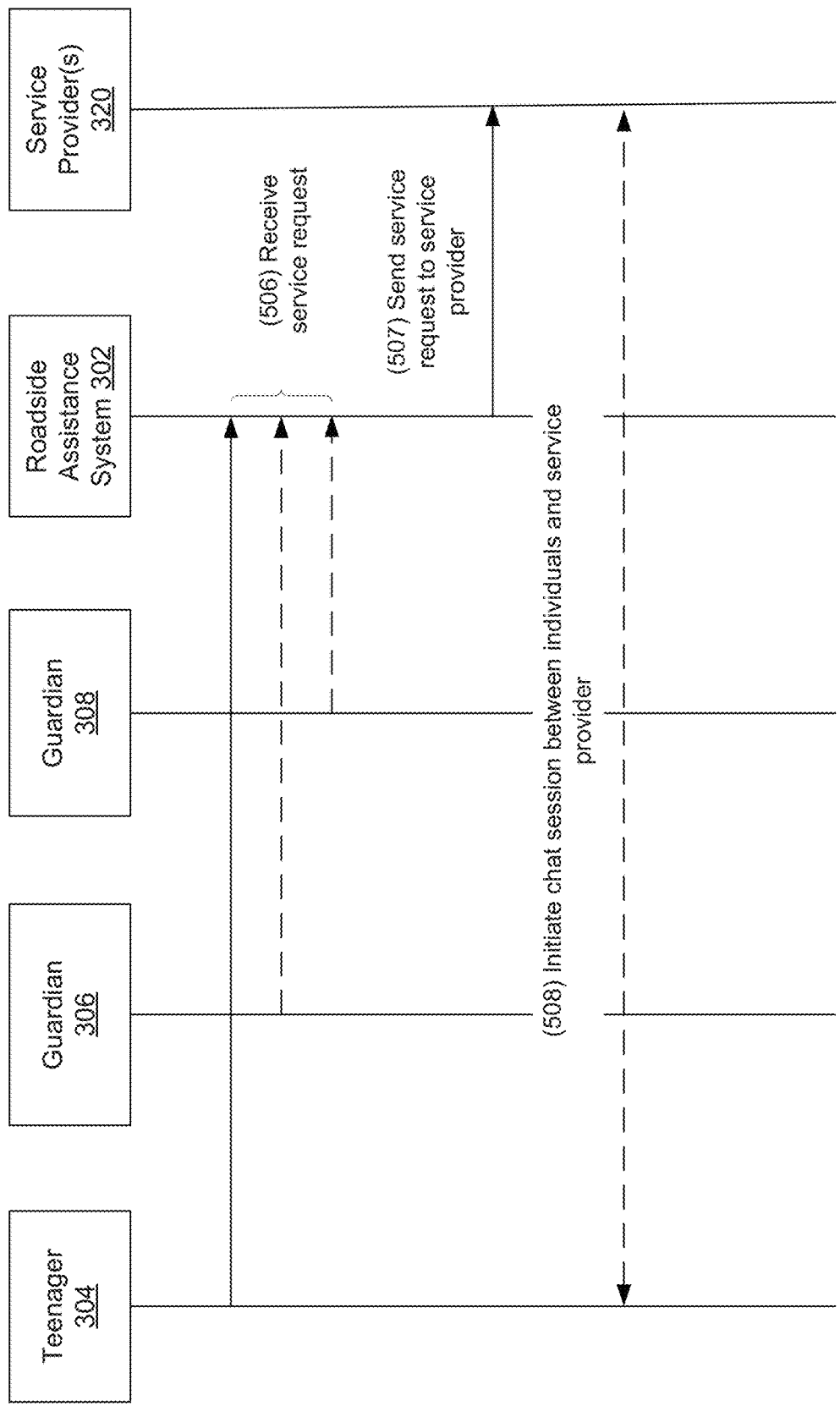

FIGS. 5A and 5B illustrate a sequence diagram of an example method in accordance with aspects of the present disclosure. The sequence diagram of FIGS. 5A and 5B shows a sequence of steps for exchanging communications between the computing devices respectively operated by the teenager 304, the first guardian 306, the second guardian 308, the roadside assistance system 302, and the one or more service providers 320. In some embodiments, one or more insurance agents 310 may be associated with and/or included in the roadside assistance system 302. As illustrated in FIG. 5A, the sequence of steps in the sequence diagram may begin at step 501 in which the roadside assistance system 302 may receive driver information from at least one individual associated with a vehicle (e.g., vehicle 217). For example, at least one of the teenager 304, the first guardian 306, or the second guardian 308 may send driver information to the roadside assistance system 302 as illustrated in FIG. 5A, wherein the driver information may be sent from at least one of the roadside assistance device 212, telematics device 218, or mobile device 220. At step 502, the roadside assistance system 302 may assign roles to each individual, resulting in an assignment of roles. For example, the roadside assistance system 302 may assign a first role (e.g., an administrative role) to a first individual (e.g., the first guardian 306), a second role (e.g., a non-administrative role) to a second individual (e.g., the teenager 304), a third role (e.g., an administrative role or a non-administrative role) to a third individual (e.g., the second guardian 308), and so forth. In some embodiments, the third individual may be a spouse of the first individual, such as a husband and wife associated with a vehicle. At step 503, the roadside assistance system 302 may send a notification based on the assignment of roles to at least one individual. For example, the roadside assistance system 302 may send the notification to at least one of first individual, the second individual, or the third individual (e.g., the teenager 304, the first guardian 306, or the second guardian 308).

At step 504, the roadside assistance system 302 may also receive a location and/or status update regarding the vehicle 217 from at least one individual. For example, the second individual (e.g., the teenager 304) may be involved in a roadside incident and may send a location and/or status update regarding the vehicle 217 to the roadside assistance system 302. A location may correspond to GPS coordinates indicating the location of a roadside assistance device 212 associated with the second individual. A status update may comprise an update regarding the condition of the vehicle (e.g., whether or not the vehicle is damaged or in need of repairs), the condition of passengers in the vehicles (e.g., whether or not individuals within the vehicle have been hurt or are in need of medical assistance), and the like. After receiving the location and/or status update from the at least one individual, at step 505, the roadside assistance system 302 may send the location and/or status update to each of the individuals (e.g., the teenager 304, first guardian 306, and second guardian 308). For example, after receiving the location and/or status update from the second individual, the roadside assistance system 302 may send the location and/or status update to the first individual and the third individual (e.g., the first guardian 306 and the second guardian 308). The roadside assistance system 302 may ultimately inform other individuals of the status and location of an individual associated with the vehicle 217, while facilitating communication among the one or more individuals, including the teenager 304, first guardian 306, and second guardian 308.

Referring now to FIG. 5B, at step 506, the roadside assistance system 302 may receive a service request from at least one individual. For example, the second individual (e.g., the teenager 304) may be the one involved in the roadside incident, but the first individual (e.g., the first guardian 306) or the third individual (e.g., the second guardian 308) may be the one to request service on behalf of the first individual. As illustrated in FIG. 5B, the roadside assistance system 302 may receive a service request from the first individual. At step 507, the roadside assistance system 302 may send the service request to a service provider 320. In some embodiments, the service provider 320 may be designated by the first individual, wherein the first individual may be assigned a set of privileges that permit modification of one or more settings for the roadside assistance account. The first individual may be able to determine preferred service providers for certain repairs or services. At step 508, the roadside assistance system 302 may allow communication between the individuals (e.g., the teenager 304, the first guardian 306, and the second guardian 308) and the service provider 320. For example, the roadside assistance system 302 may initiate a chat, a phone call (e.g., a conference call), a group message (e.g., SMS, MMS), or other form of communication that is accessible to users by a computing device (e.g., roadside assistance device 100, roadside assistance device 212). In some instances, the form of communication may be accessible by a roadside assistance application that is available to the individuals associated with the vehicle 217 and one or more service providers 320.

FIGS. 6-11 each depict an illustrative diagram of example user interfaces of an enhanced roadside assistance application 602 operating on an enhanced roadside assistance device 600 in accordance with aspects of the present disclosure. The example user interfaces may be presented on a display of a computing device, such as display 214 of roadside assistance device 212. An individual associated with a vehicle, such as vehicle 217, may access a roadside assistance application 602 using an enhanced roadside assistance device 600 (e.g., at least one of the roadside assistance device 212, telematics device 218, or mobile device 220). Specifically, FIGS. 6A and 6B illustrate example user interfaces of utilizing a roadside assistance application 602 to request service. The user interface in FIG. 6A depicts a menu for the roadside assistance application 602 that may be displayed on the enhanced roadside assistance device 600. The individual associated with the enhanced roadside assistance device 600 may tap on a button or icon on the user interface to navigate to different screens in the roadside assistance application 602. For example, the individual may select one or more of the following options: "Request Service", "View Incident Details", "Send/View Messages", "View Status Updates", "View Account Information", and "Settings/Preferences."

Figure 6B:
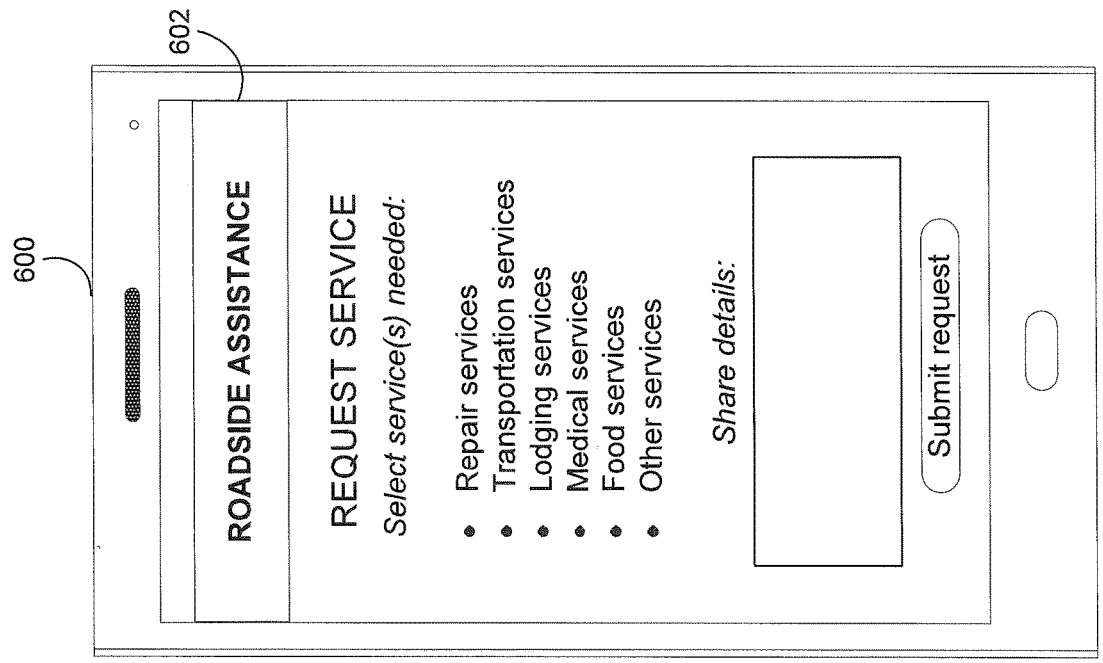
FIGS. 6A and 6B depict an illustrative diagram of an example of a user interface of an enhanced roadside assistance application in accordance with one or more example embodiments.
Figure 6A:
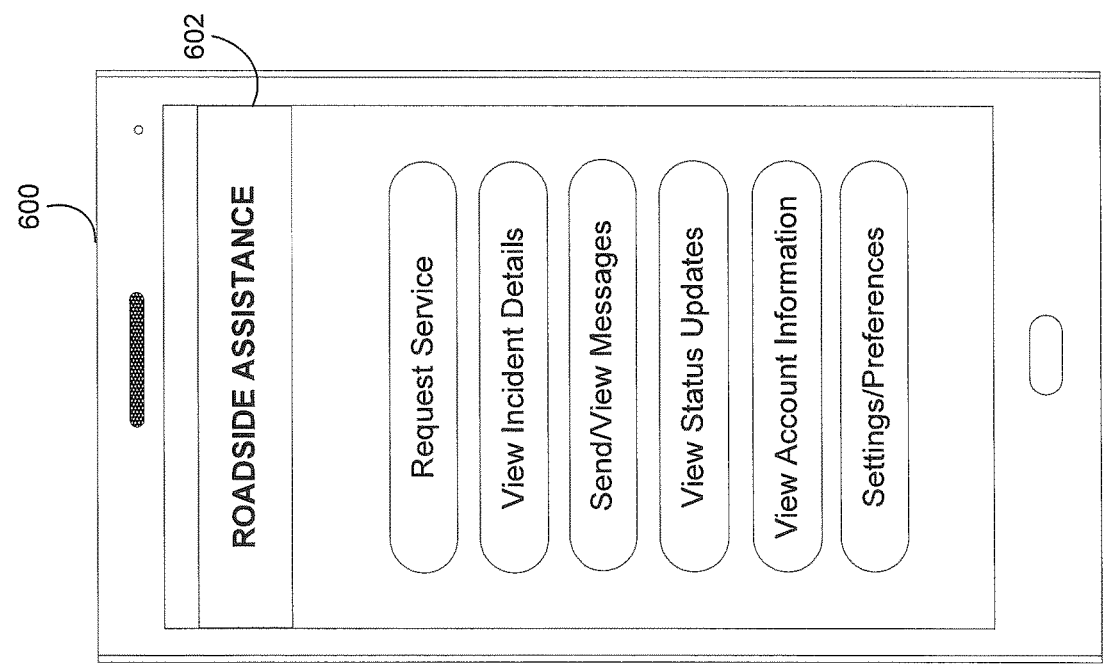

The user interface in FIG. 6B depicts what may be displayed on the enhanced roadside assistance device 600 after the individual selects the "Request Service" option shown in the FIG. 6A user interface. In this screen, the individual may select one or more types of services for a service request, such as repair services, transportation service, lodging services, medical services, food services, and other services. The individual may also provide and/or share details for the service request, such as details regarding a roadside incident in which the individual may have been involved with a vehicle, details regarding the location of the roadside incident, details regarding the condition of the vehicle and/or passengers in the vehicle, and the like. Through the roadside assistance application 602, the individual may be able to indicate a type of service desired and submit a service request to the roadside assistance system, wherein the service request may be forwarded to at least one of one or more service providers, other individuals associated with the vehicle, or one or more insurance agents.

Figure 7B:
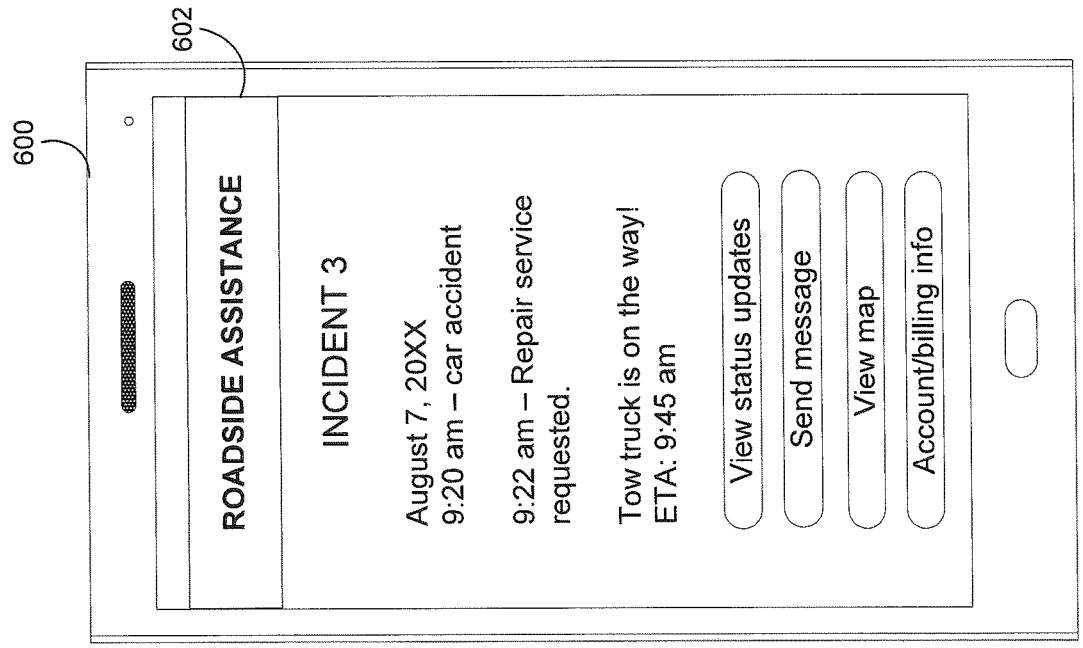
FIGS. 7A and 7B depict an illustrative diagram of an example of a user interface of an enhanced roadside assistance application in accordance with one or more example embodiments.
Figure 7A:
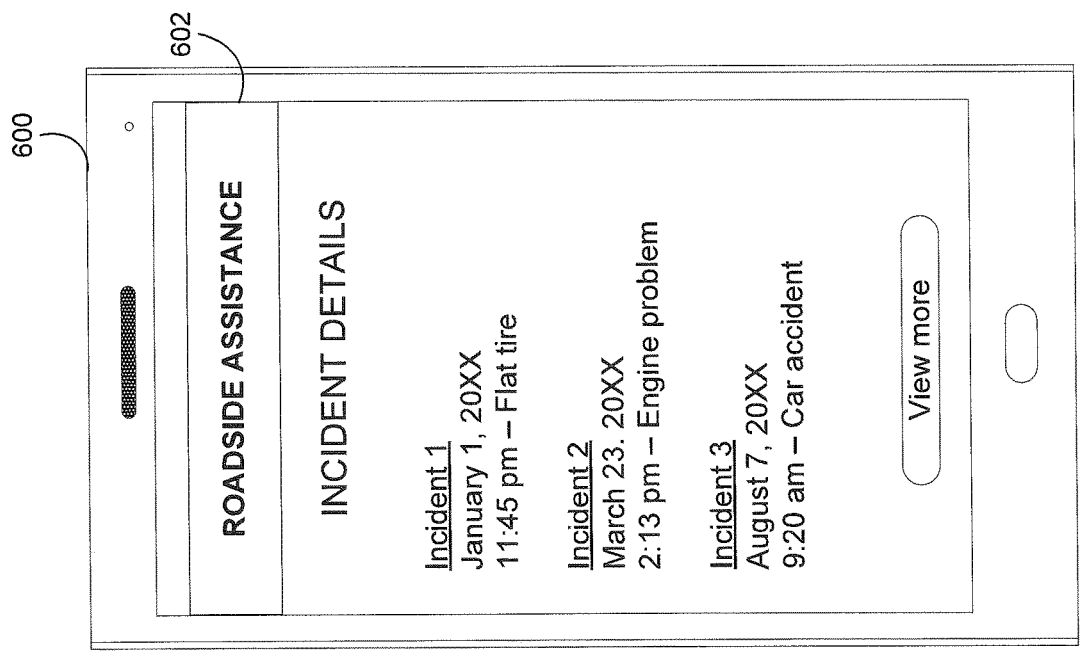

FIGS. 7A and 7B illustrate example user interfaces of utilizing a roadside assistance application 602 to view and/or update details regarding roadside incidents. An individual may be able to navigate to the user interfaces shown in FIGS. 7A and 7B by selecting the "View Incident Details" option shown in the FIG. 6A user interface. The user interface in FIG. 7A depicts examples of roadside incidents and details which may be available to one or more individuals. For example, individuals associated with the vehicle 217 (e.g., teenager 304, first guardian 306, second guardian 308) may be able to view information regarding roadside incidents through the roadside assistance application 602. In another embodiment, individuals may also be able to view incident details for multiple vehicles associated with an insurance account and/or roadside assistance account. For example, there may be multiple vehicles that are covered by an insurance policy of an individual. One or more individuals that are listed on the insurance policy may be able to access incident details for each of the multiple vehicles that are covered by insurance. Incident details may comprise at least one of a time, date, location, passenger information, and other details corresponding to each roadside incident. As an example, other details may comprise photographs of a vehicle after a roadside incident.

The roadside assistance system may also maintain a log or a record of previous incidents and/or previous services that were performed for one or more vehicles by service providers. Individuals may also be able to view incident histories and details through the user interfaces. For example, the user interface in FIG. 7B depicts what may be displayed on the enhanced roadside assistance device 600 after selecting a particular incident (e.g., incident 3) shown on the FIG. 7A user interface. The individual may be able to navigate to other screens displaying information, such as status updates, messages, account/billing information, and the like. The roadside assistance application 602 may also provide a map feature to individuals associated with the vehicle to show at least one of individuals, service providers, or insurance agents where a vehicle is located (e.g., a location corresponding to a roadside incident). An individual involved in a roadside incident may use the map feature in the roadside assistance application 602 to pinpoint his or her location for other individuals associated with the vehicle, for service providers, and/or for insurance agents.

Figure 8B:
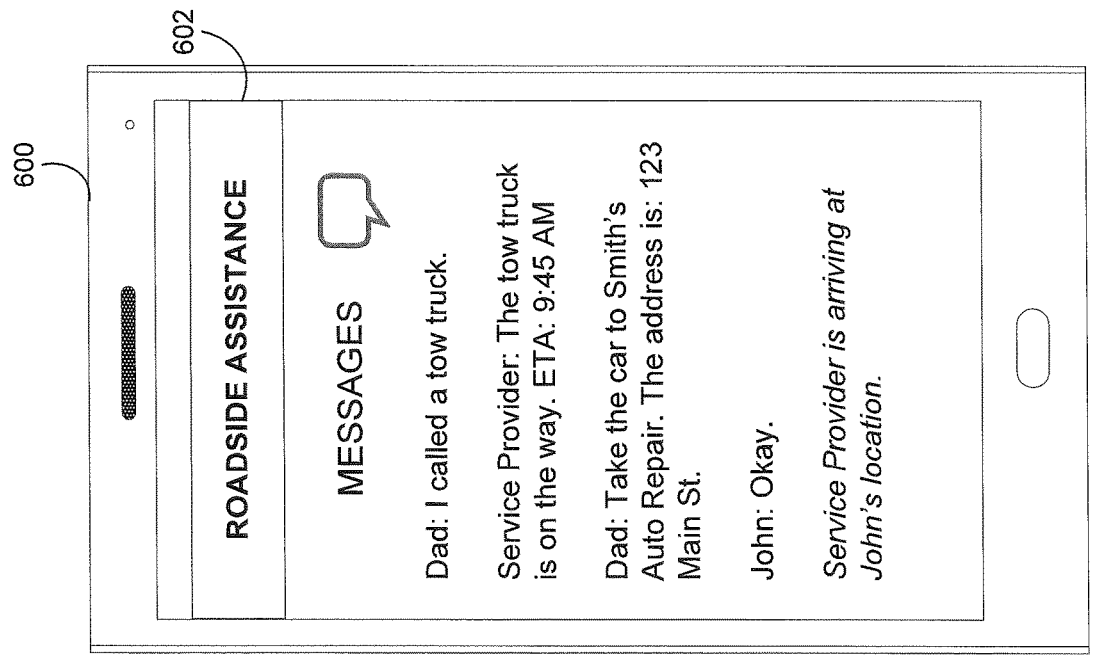
FIGS. 8A and 8B depict an illustrative diagram of an example of a user interface of an enhanced roadside assistance application in accordance with one or more example embodiments.
Figure 8A:
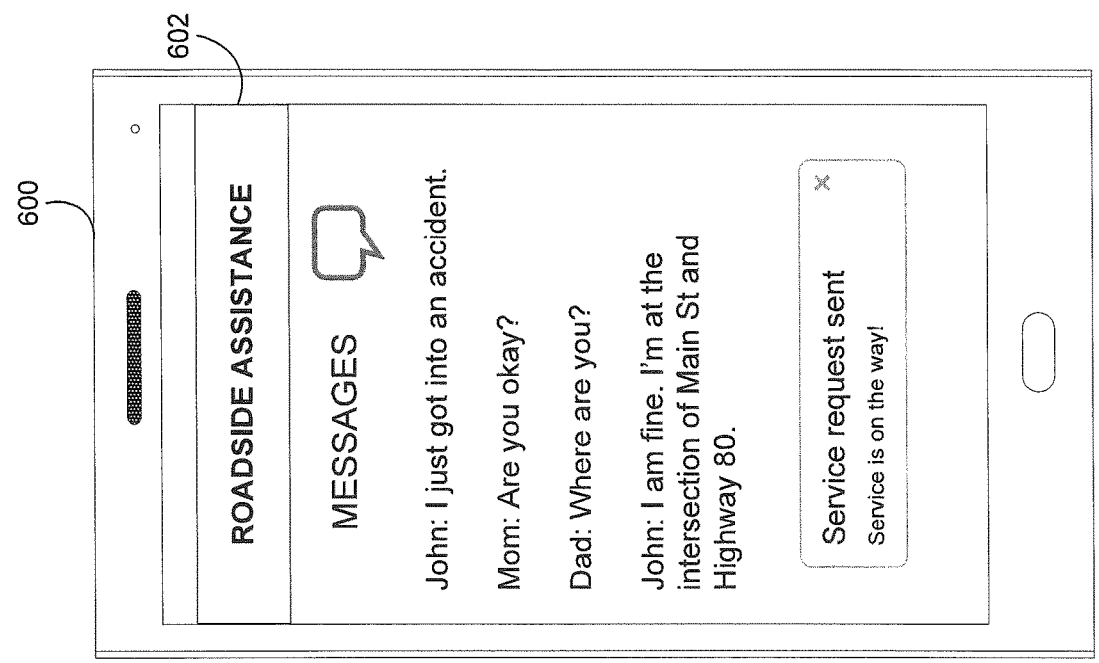

FIGS. 8A and 8B illustrate example user interfaces of utilizing a roadside assistance application 602 for messaging. An individual may be able to navigate to the user interfaces shown in FIGS. 8A and 8B by selecting the "Send/View Messages" option shown in the FIG. 6A user interface. The user interfaces in FIGS. 8A and 8B depict an example of a chat between individuals and a service provider. For example, an individual associated with enhanced roadside assistance device 600 may communicate via messages with at least one of other individuals, one or more service providers, or one or more insurance agents. The user interfaces in FIGS. 8A and 8B illustrate a conversation between John (e.g., teenager 304), dad (e.g., first guardian 306), mom (e.g., second guardian 308), and service provider (e.g., service provider 320). In some embodiments, the teenager 304 may use the roadside assistance application 602 to alert the first guardian 306 and the second guardian 308 of a car accident. At least one of the teenager 304, first guardian 306, or second guardian 308 may submit a service request through the roadside assistance application 602. For example, the first guardian 306 may request for a tow truck after the teenager 304 has been involved in the car accident. As illustrated in the FIG. 8B user interface, a service provider 320 (e.g., the tow truck driver) may also be added to the conversation to share information and status updates to individuals. For example, the service provider 320 may share his location and estimated time of arrival (ETA) with the teenager 304, first guardian 306, and second guardian 308. By employing the messaging features of the roadside assistance application 602, at least one of the teenager 304, first guardian 306, or second guardian 308 may communicate with the service provider 320 and provide the service provider 320 with specific details regarding the vehicle or instructions regarding the repair.

Figure 9B:
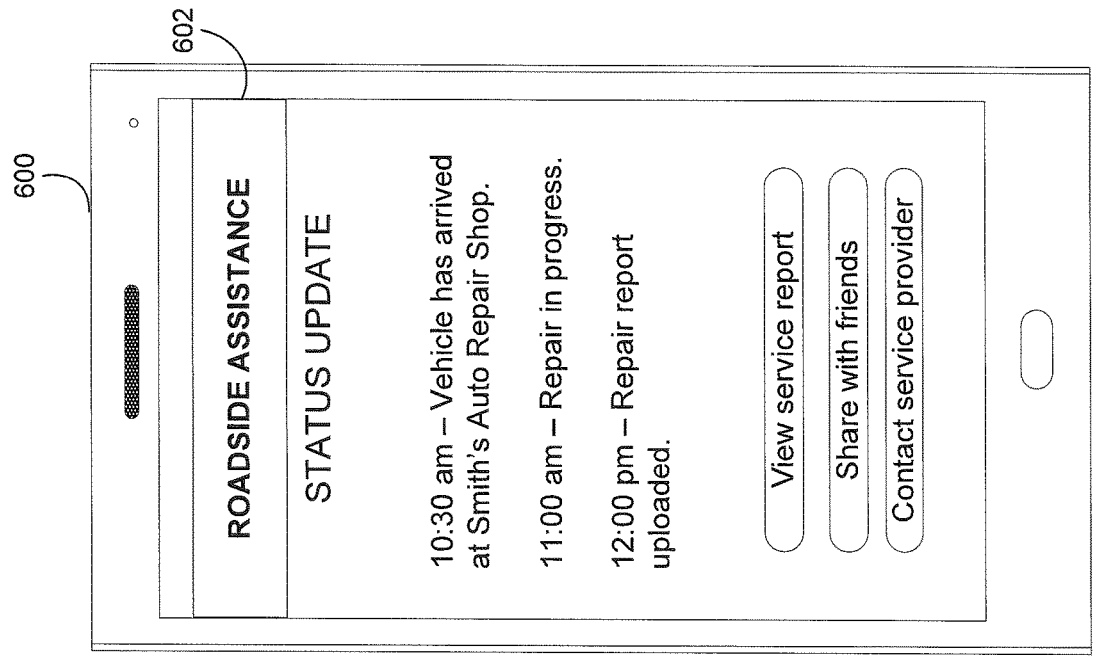
FIGS. 9A and 9B depict an illustrative diagram of an example of a user interface of an enhanced roadside assistance application in accordance with one or more example embodiments.
Figure 9A:
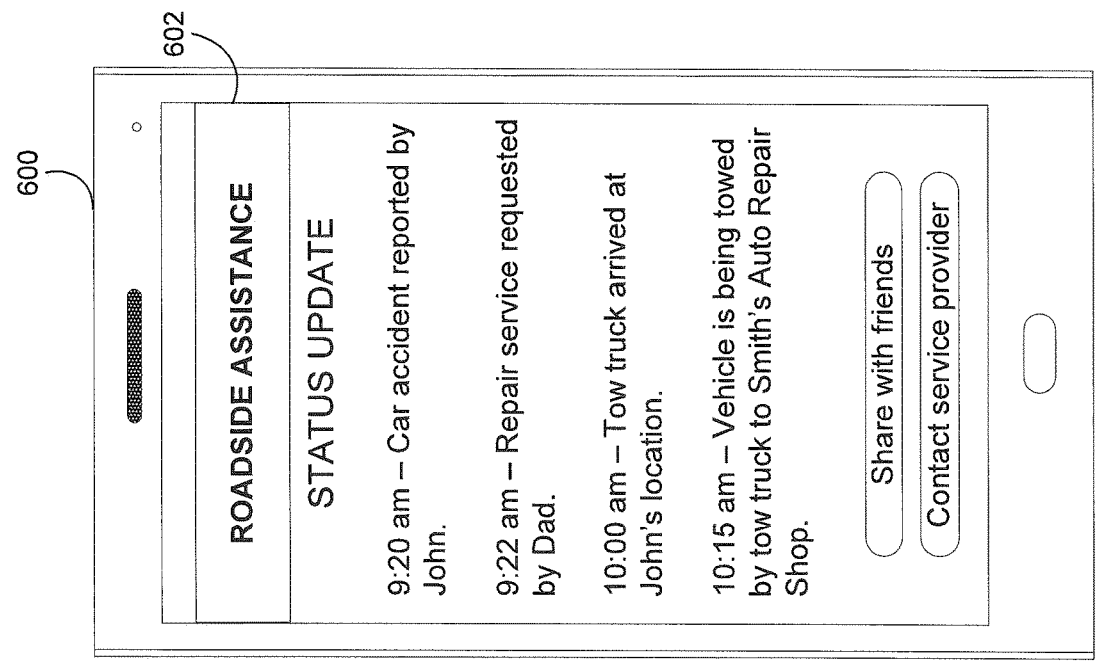

FIGS. 9A and 9B illustrate example user interfaces of utilizing a roadside assistance application 602 to view and/or share status updates. An individual may be able to navigate to the user interfaces shown in FIGS. 9A and 9B by selecting the "View Status Updates" option shown in the FIG. 6A and FIG. 7B user interfaces. The user interfaces in FIGS. 9A and 9B depict examples of status updates associated with a roadside incident, wherein the status updates may be available to one or more individuals. For example, individuals associated with the vehicle 217 (e.g., teenager 304, first guardian 306, second guardian 308) may be able to view status updates regarding roadside incidents (e.g., for one or more vehicles) through the roadside assistance application 602. In an embodiment, individuals associated with the vehicle 217 may be provided with status updates in real-time (e.g., push notifications, text messages, and the like). In another embodiment, the status updates may provide a timeline of events associated with a roadside incident. For example, the status updates may include a description of the roadside incident reported, a time of when the roadside incident was first reported, and by whom (e.g., teenager 304, first guardian 306 or second guardian 308) the incident was reported. In another example, a status update may comprise a repair status of a vehicle after a roadside incident. Individuals may share status updates with friends and/or with social media by selecting the "Share with friends" option in the FIG. 9A user interface. Individuals may be able to use the roadside assistance application 602 to post status updates to external websites and to connect to social media platforms, such as Facebook, Twitter, and the like, to keep friends updated on details of a roadside incident. Once a service (e.g., a repair) has been completed by a service provider, individuals may download or access a service report (e.g., a repair report) by selecting the "View service report" option in the FIG. 9B user interface.

Additionally, individuals may contact one or more service providers by selecting the "Contact service provider" option in the FIG. 9A user interface in order to inquire regarding a status or to receive more information. In some embodiments, individuals may contact one or more service providers to obtain instructions on how to repair a vehicle on their own. For example, an individual may get a flat tire on their vehicle and may wish to change the tire on their own. The individual may be able to access the roadside assistance application 602 to ask a service provider, such as a mechanic, for assistance on changing the tire (e.g., via a phone call, chat, and the like). The dialogue during the phone call or chat with the service provider may be recorded and accessible through the roadside assistance application 602. By using the roadside assistance application 602, the individual may refer to the transcript of the call or chat to access details on how to repair the vehicle as discussed with the service provider. In an embodiment, the individual may access the roadside assistance application 602 to obtain instructions by at least one of instruction manuals, videos (e.g., via YouTube), pictures, and the like. In another embodiment, the individual may be able to connect to a vehicle diagnostics service through the roadside assistance application 602, wherein the vehicle diagnostics service may help diagnose issues with the vehicle.

Figure 10B:
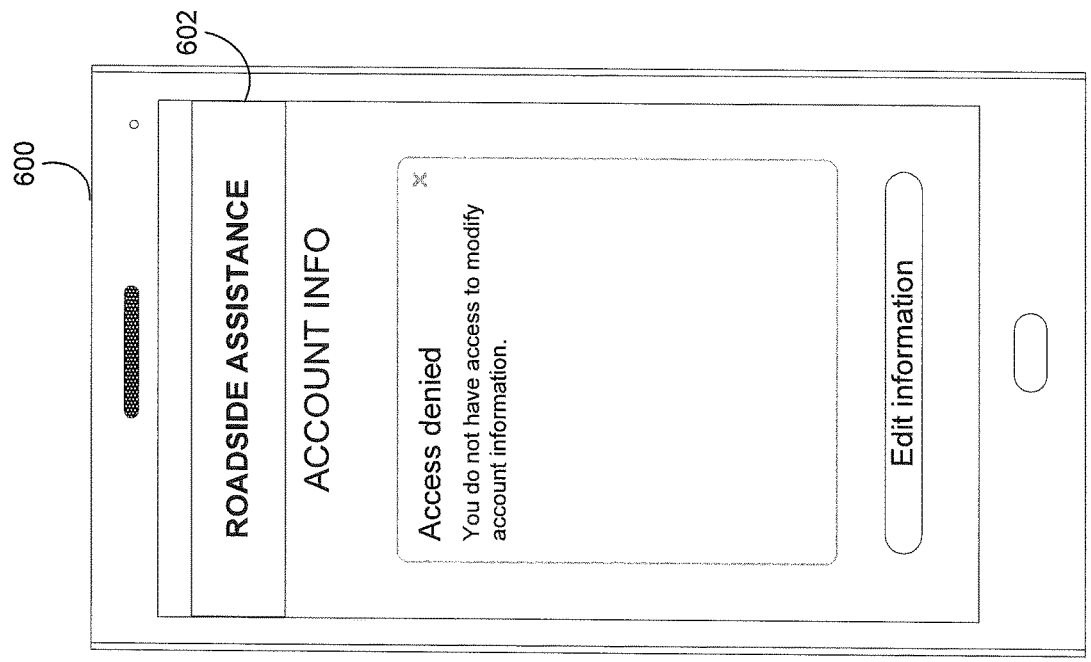
FIGS. 10A and 10B depict an illustrative diagram of an example of a user interface of an enhanced roadside assistance application in accordance with one or more example embodiments.
Figure 10A:
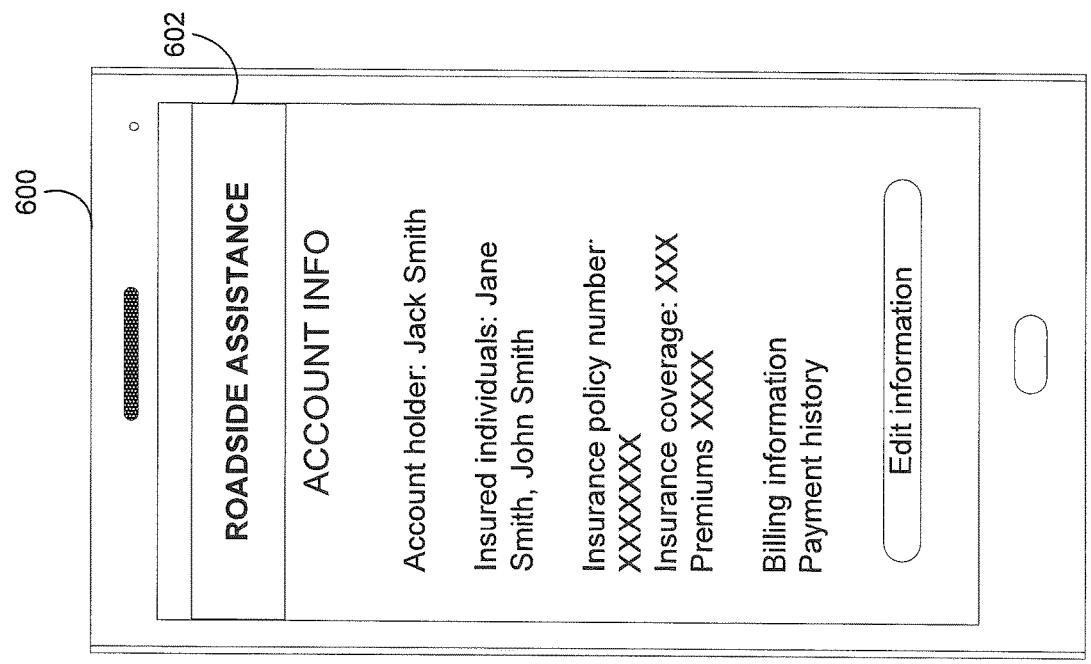

FIGS. 10A and 10B illustrate example user interfaces of utilizing a roadside assistance application 602 to view and/or edit account information. An individual may be able to navigate to the user interfaces shown in FIGS. 10A and 10B by selecting the "View Account Information" option shown in the FIG. 6A user interface and/or by selecting the "Account/billing info" option in the FIG. 7B user interface. The user interface in FIG. 10A depicts example account information corresponding to one or more individuals associated with the vehicle 217. Account information may include an account holder, insured individuals, an insurance policy number, insurance coverage, premiums, deductibles, billing information, payment history, and the like. For example, the account holder may be the first guardian 306, and there may be a number of individuals associated with the vehicle 217 (e.g., second guardian 308, teenager 304). In an embodiment, the account holder, such as the first guardian 306, may be assigned an administrative role with a first set of privileges that permit modification of one or more settings for the roadside assistance account. In another embodiment, the insured individuals, such as the second guardian 308 and teenager 304) may each be assigned a non-administrative role with a second set of privileges that do not permit modification of one or more settings of the roadside assistance account. Thus, the first guardian 306 may be able to modify one or more settings or account information by selecting the "Edit information" option in the FIG. 10A user interface. However, the second guardian 308 and teenager 304 might not be able to modify one or more settings or account information. For instance, the user interface in FIG. 10B shows an example of an access denied window that may be displayed by the roadside assistance application 602 when an individual with a non-administrative role attempts to modify information by selecting the "Edit information" option in the FIG. 10A user interface. In an embodiment, the "Edit information" option in the FIG. 10A user interface might not be available to individuals without administrative privileges (e.g., individuals in non-administrative roles). In another embodiment, a first individual with an administrative role may provide access to modify account and/or billing information (e.g., temporarily or permanently) to a second individual with a non-administrative role. For example, the second set of privileges assigned to an individual in a non-administrative role may permit the individual to access and/or modify billing information to submit a payment to a payment system of a service provider for repair of a vehicle after a roadside incident.

Figure 11A:
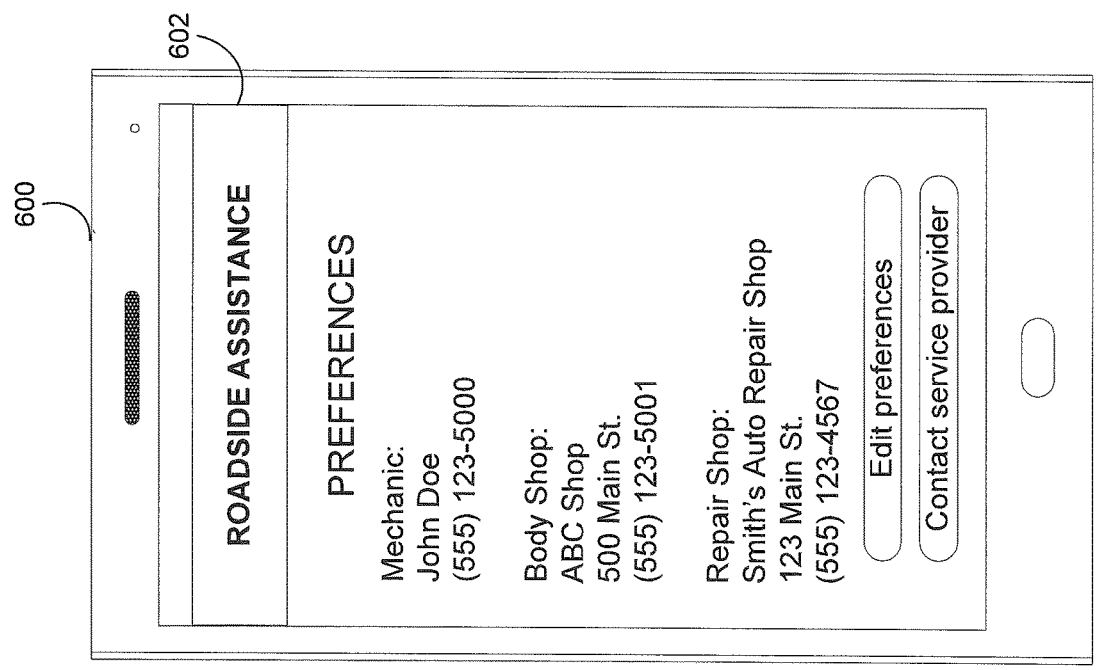
FIGS. 11A and 11B depict an illustrative diagram of an example of a user interface of an enhanced roadside assistance application in accordance with one or more example embodiments.
Figure 11B:
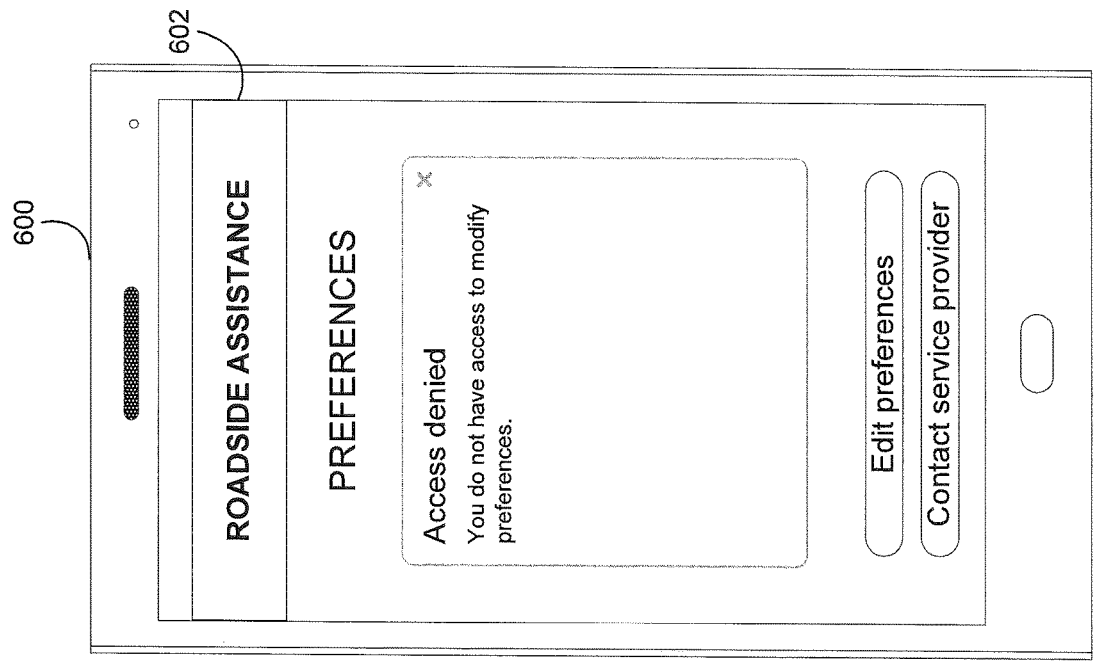

FIGS. 11A and 11B illustrate example user interfaces of utilizing a roadside assistance application 602 to view and/or edit preferences. An individual may be able to navigate to the user interfaces shown in FIGS. 11A and 11B by selecting the "Settings/Preferences" option shown in the FIG. 6A user interface. The user interface in FIG. 11A shows examples of preferences, such as one or more service providers that have been designated by an individual with an administrative role. For example, the individual may determine one or more specific mechanics, body shops, repair shops, and the like that a vehicle (e.g., vehicle 217) is to be taken to after a roadside incident. In some embodiments, one or more individuals with an administrative role (e.g., first guardian 306, second guardian 308) may modify or edit preferences, such as preferred service providers, by selecting the "Edit Preferences" option in the FIG. 11A user interface. However, individuals with a non-administrative role (e.g., teenager 304) might not able to modify one or more preferences. For instance, the user interface in FIG. 11B shows an example of an access denied window that may be displayed by the roadside assistance application 602 when an individual with a non-administrative role attempts to modify preferences by selecting the "Edit preferences" option in the FIG. 11A user interface. In an embodiment, the "Edit preferences" option in the FIG. 11A user interface might not be available to individuals without administrative privileges (e.g., individuals in non-administrative roles). In another embodiment, a first individual with an administrative role may provide access to modify preferences (e.g., temporarily or permanently) to a second individual with a non-administrative role.

Figure 12A:
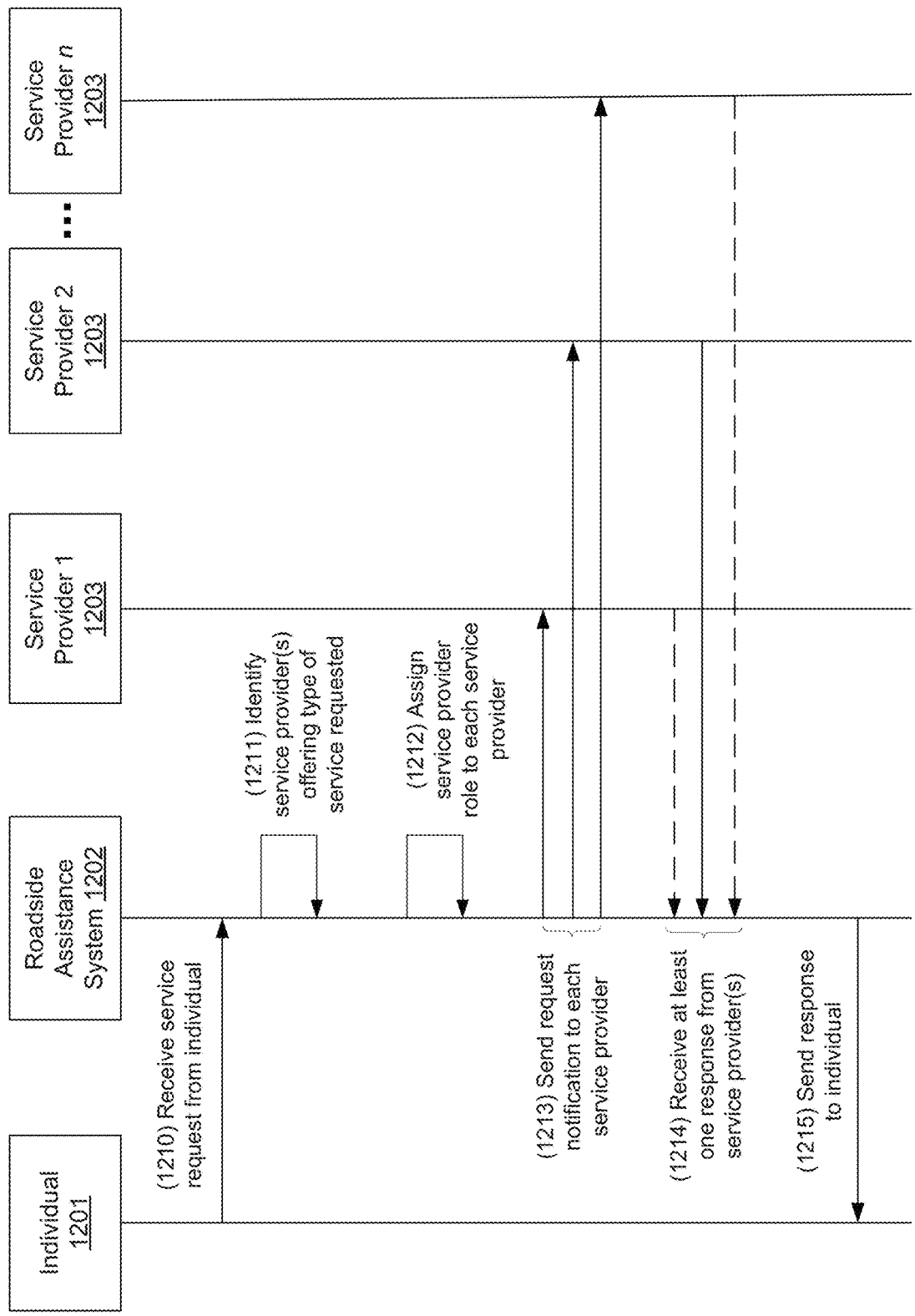
FIGS. 12A and 12B depict an illustrative event sequence for assigning service provider roles and providing roadside assistance services for individuals in accordance with one or more example embodiments.
Figure 12B:
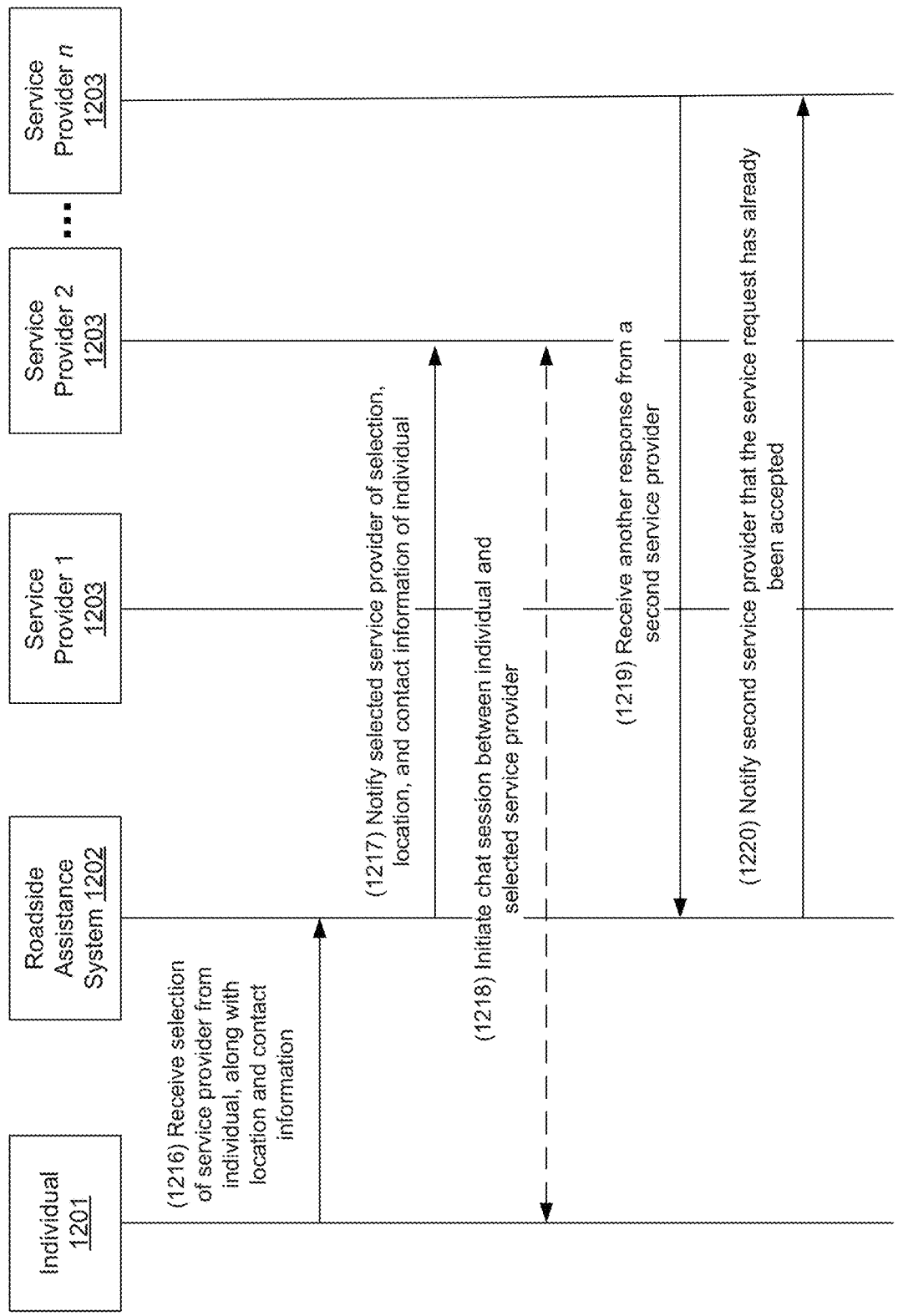

FIGS. 12A and 12B illustrate another sequence diagram of an example method in accordance with aspects of the present disclosure. The sequence diagram of FIGS. 12A and 12B shows a sequence of steps for communication between an individual 1201, a roadside assistance system 1202, and one or more service providers 1203. In some embodiments, the individual 1201 may be associated with the vehicle 217 and at least one of the roadside assistance device 212, telematics device 218, or mobile device 220. The individual 1201 may be at least one of a teenager 304, first guardian 306, or second guardian 308. The roadside assistance system 1202 and the one or more service providers 1203 may be the same as the roadside assistance systems 202, 302 and the one or more service providers 224, 320, respectively, as illustrated in previous figures. In FIG. 12A, the sequence of steps in the sequence diagram may begin at step 1210 in which the roadside assistance system 1202 may receive a service request from the individual 1201. For example, the individual 1201 may send the service request to the roadside assistance system 1202 after a roadside incident involving the vehicle 217, wherein the vehicle is registered in a roadside assistance account. At step 1211, the roadside assistance system 1202 may identify one or more service providers 1203 offering a type of service indicated by the service request. For example, the type of service indicated in the service request may include at least one of a repair service, transportation service, lodging service, medical service, or food service, and the roadside assistance system 1202 may determine which of the one or more service providers 1203 offer the type of service requested.

At step 1212, the roadside assistance system 1202 may assign a service provider role to computing systems respectively operated by each of the one or more service providers 1203 that offer the type of service requested, resulting in an assignment of service provider roles. The service provider role may allow the one or more service providers 1203 (e.g., service providers 1203 offering the requested type of service) to receive notifications, accept service requests, and/or bid on service requests submitted by individuals. At step 1213, the roadside assistance system 1202 may send a request notification to each of the one or more service providers 1203 offering the type of service requested. For example, the roadside assistance system 1202 may send a notification regarding the service request to each of the one or more service providers 1203 based on the assignment of service provider roles. In an embodiment, there may be n service providers 1203, wherein n is greater than or equal to 1. At step 1214, the roadside assistance system 1202 may receive at least one response from one or more service providers 1203. That is, upon receiving the request notification, one or more of the n service providers 1203 may respond to the service request by submitting a proposed price for the type of service, offering one more discounts for the type of service, bidding on the service request, accepting the service request, or the like. At step 1215, the roadside assistance system 1202 may send the at least one response to the individual 1201.

Referring now to FIG. 12B, at step 1216, the roadside assistance system 1202 may receive a message comprising a selection of the one or more service providers 1203 from the individual 1201, along with a location and contact information associated with the individual 1201. For example, the individual 1201 may make his or her selection based on one of a bid, proposed price, details of the type of service, discounts, coupons, and/or deals offered by a certain service provider 1203. At step 1217, the roadside assistance system 1202 may notify the selected service provider 1203 of the selection, location, and contact information from the individual 1201. In some embodiments, the selected service provider 1203 may send an additional confirmation to the roadside assistance system 1202 to confirm that the selected service provider 1203 will be able to provide the requested service to the individual 1201. After notifying the selected service provider 1203, at step 1218, the roadside assistance system 1202 may set up a chat session or group messaging between the individual 1201 and the selected service provider 1203. For example, the selected service provider 1203 may be able to communicate with the individual 1201 through messaging features of a roadside assistance application (e.g., roadside assistance application 602), such as through a mobile device (e.g., mobile device 220). In another embodiment, the selected service provider 1203 may be able to message and/or communicate with multiple individuals associated with the vehicle (e.g., teenager 304, first guardian 306, second guardian 308). The selected service provider 1203 may be able to share and/or request information from one or more individuals associated with the vehicle by at least one of a chat, group message, text message, mobile web, mobile application, phone call, or the like.

At step 1219, the roadside assistance system 1202 may receive another response from a second service provider 1203. For example, the roadside assistance system 1202 may receive the response from the second service provider 1203 after receiving the at least one response in step 1214 from the one or more service providers 1203. At step 1220, the roadside assistance system 1202 may notify the second service provider 1203 that the service request has already been accepted. For example, the roadside assistance system 1202 may send a message to the second service provider 1203 to convey that another service provider 1203 already accepted the service request or that the individual 1201 already selected another service provider 1203. For example, the individual 1201 may have already selected a first service provider 1203, or a first service provider 1203 may have been the first out of the one or more service providers 1203 to respond to the service request. This notification in step 1220 may allow the second service provider to look for and accept other service requests and provide services to others.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
   modifying, by a computing device, a service provider role assignment associated with a roadside assistance account by assigning a service provider role to each of one or more service providers offering at least one type of service;
   receiving, by the computing device from a sensor on a first roadside assistance device, data associated with driving behavior of a first individual as a driver of a vehicle;
   receiving, by the computing device from a roadside assistance application running on the first roadside assistance device associated with the first individual, a service request for the first individual associated with the vehicle after a roadside incident, wherein the vehicle is registered in the roadside assistance account, and a driver role assignment is determined for the first individual based on the data associated with the driving behavior of the first individual comprising GPS coordinates of the first roadside assistance device;
   determining, by the computing device and based on the data associated with the driving behavior of the first individual comprising the GPS coordinates of the first roadside assistance device, that the first individual has a non-administrative driver role associated with the vehicle;
   transmitting, by the computing device, the request notification of the service request and the data to a second roadside assistance device for presentation to a second individual via the roadside assistance application, wherein the second individual has an administrative driver role associated with the vehicle;
   transmitting, by the computing device, a request notification of the service request and the data to at least one of the one or more service providers based on the service provider role assignment and the driver role assignment;
   receiving, by the computing device, a response from at least one of the service providers, wherein the response comprises one or more discounts for the type of service offered by the service provider;
   transmitting, by the computing device, the response to the second roadside assistance device for presentation to the second individual via the roadside assistance application;
   receiving, by the computing device from the second individual, a designation of a service provider selected from the at least one of the service providers;
   transmitting, by the computing device, a confirmation to the designated service provider that the designated service provider has been selected;
   receiving, by the computing device, an acceptance of the service request from the designated service provider; and
   causing, by the computing device, the roadside assistance application to open a chat session between the second roadside assistance device, the first roadside assistance device, and a device associated with the designated service provider.

2. The method of claim 1, further comprising:
   receiving, by the computing device from the first roadside assistance device, a location of the first individual;

obtaining, by the computing device, contact information of the first individual; and transmitting, by the computing device to the designated service provider, a notification of the designation, the location of the first individual, and the contact information of the first individual.

3. The method of claim 2, wherein the designated service provider is selected by the second individual based on a bid with a proposed price for the type of service indicated by the service request and details of the type of service offered by the designated service provider.

4. The method of claim 1, further comprising:
receiving, by the computing device, a first response from a first service provider for accepting the service request for the first individual;
transmitting, by the computing device, a first notification to the first service provider and the second roadside assistance device that the service request has been accepted by the first service provider;
receiving, by the computing device, a second response from a second service provider for accepting the service request for the first individual; and
transmitting, by the computing device, a second notification to the second service provider that the service request has already been accepted by the first service provider.

5. The method of claim 1, wherein the response from at least one of the service providers comprises a bid with a proposed price for the type of service indicated by the service request and details of the type of service offered by the one or more service providers.

6. The method of claim 1, wherein the response from the at least one of the service providers further comprises additional discounts for other types of services offered by the one or more service providers.

7. The method of claim 6, wherein the additional discounts for the other types of services offered by the one or more service providers are based on a record of previous services provided to the first individual.

8. The method of claim 1, wherein the type of service comprises one of repair services, transportation services, lodging services, medical services, and food services.

9. The method of claim 1, wherein the service provider role allows the one or more service providers to access details of the roadside incident and communicate with the first individual.

10. A system comprising:
a first roadside assistance device associated with a first individual associated with a vehicle that is registered in a roadside assistance account, the first roadside assistance device storing a roadside assistance application and the first roadside assistance device comprising a sensor that collects data associated with driving behavior of a first individual as a driver of the vehicle;
a plurality of computing devices individually associated with one of a plurality of service providers that offer at least one type of service; and
a computer-implemented roadside assistance system configured to:
modify a service provider role assignment associated with the roadside assistance account by assigning a service provider role to each of the plurality of service providers;
receive, from the sensor, the data associated with the driving behavior of the first individual comprising GPS coordinates of the first roadside assistance device;
determine a driver role of the first individual associated with the vehicle, based on the data associated with the driving behavior of the first individual comprising the GPS coordinates of the first roadside assistance device;
receive, from the roadside assistance application running on the first roadside assistance device, a service request for the first individual after a roadside incident with the vehicle;
identify one or more of the service providers offering a type of service indicated by the service request;
based on the service provider role assignment and driver role determination, transmit a notification of the service request and the data to at least one of the plurality of computing devices associated with the one or more of the service providers;
receive, from at least one of the plurality of computing devices, a response associated with the one or more of the service providers, wherein the response comprises one or more discounts for the type of service offered by the one or more of the service providers;
responsive to determining that the first individual has a non-administrative driver role:
transmit the response to a second roadside assistance device for presentation to a second individual with an administrative driver role via the roadside assistance application;
receive, from the second individual with the administrative driver role associated with the vehicle, a designation of a service provider from the one or more of the service providers via the roadside assistance application;
transmit, to a computing device associated with the designated service provider, a confirmation that the designated service provider has been selected;
receive, by the computer-implemented roadside assistance system, an acceptance of the service request from the designated service provider; and
cause the roadside assistance application to open a chat session between the second roadside assistance device, the first roadside assistance device, and a computing device, of the plurality of computing devices, associated with the designated service provider.

11. The system of claim 10, wherein the response associated with the one or more of the service providers comprises a bid with a proposed price for the type of service indicated by the service request and details of the type of service offered by the one or more of the service providers.

12. The system of claim 10, wherein the response associated with one or more of the service providers further comprises additional discounts for other types of services offered by the one or more of the service providers.

13. The system of claim 12, wherein the additional discounts for other types of services offered by the one or more of the service providers are based on a record of previous services provided to the first individual.

14. The system of claim 10, wherein the type of service comprises one of repair services, transportation services, lodging services, medical services, and food services.

15. An apparatus comprising:
at least one processor;
a network interface configured to communicate, via a network, with a first roadside assistance device and a second roadside assistance device; and
memory storing computer-readable instructions that, when executed by the at least one processor, cause the apparatus to:

modify a service provider role assignment associated with a roadside assistance account by assigning a service provider role to each of one or more service providers that offer at least one type of service;

receive, from a sensor on the first roadside assistance device associated with a first individual, data associated with driving behavior of a first individual as a driver of a vehicle comprising GPS coordinates of the first roadside assistance device;

responsive to determining that the first individual has a non-administrative driver role based on the data associated with the driving behavior of the first individual comprising the GPS coordinates of the first roadside assistance device, and determining that a second individual has an administrative driver role based on data associated with the vehicle:

receive, from a roadside assistance application running on the first roadside assistance device, a service request for the first individual associated with the vehicle after a roadside incident, wherein the vehicle is registered in the roadside assistance account;

transmit a notification of the service request and the data to at least one of the service providers based on the service provider role assignment and driver role determination;

receive a response from the at least one of the service providers, wherein the response comprises one or more discounts for the type of service offered by the at least one of the service providers;

transmit, to the second roadside assistance device, the response for presentation to the second individual with an administrative driver role associated with the vehicle, via the roadside assistance application;

receive, from the second individual with an administrative driver role associated with the vehicle, a designation of a service provider from the at least one of the service providers;

transmit a confirmation to the designated service provider that the designated service provider has been selected;

receive an acceptance of the service request from the designated service provider; and cause the roadside assistance application to open a chat session between the second roadside assistance device, the first roadside assistance device, and a device associated with the designated service provider.

16. The apparatus of claim 15, wherein the instructions, when executed by the at least one processor, further cause the apparatus to:

receive, from the first roadside assistance device, a location of the first individual;

obtain contact information of the first individual; and notify the designated service provider of the location of the first individual and the contact information of the first individual.

17. The apparatus of claim 16, wherein the designated service provider is selected by the second individual based on a bid with a proposed price for the type of service indicated by the service request and details of the type of service offered by the designated service provider.

18. The apparatus of claim 15, wherein the response from at least one of the service providers further comprises additional discounts for other types of services offered by the corresponding service provider.

\* \* \* \* \*